US012150122B2

(12) United States Patent
Huang et al.

(10) Patent No.: US 12,150,122 B2
(45) Date of Patent: Nov. 19, 2024

(54) COLLISION HANDLING FOR PARALLEL UPLINK TRANSMISSION

(71) Applicant: QUALCOMM Incorporated, San Diego, CA (US)

(72) Inventors: Yi Huang, San Diego, CA (US); Wei Yang, San Diego, CA (US); Peter Gaal, San Diego, CA (US); Seyedkianoush Hosseini, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 401 days.

(21) Appl. No.: 17/644,298

(22) Filed: Dec. 14, 2021

(65) Prior Publication Data

US 2022/0232590 A1 Jul. 21, 2022

Related U.S. Application Data

(60) Provisional application No. 63/138,504, filed on Jan. 17, 2021.

(51) Int. Cl.
*H04W 72/1268* (2023.01)
(52) U.S. Cl.
CPC .............................. *H04W 72/1268* (2013.01)
(58) Field of Classification Search
CPC ...... H04L 5/001; H04L 5/0044; H04L 5/0053
See application file for complete search history.

(56) References Cited

U.S. PATENT DOCUMENTS

| 2014/0293947 | A1* | 10/2014 | Nishikawa | H04W 72/535 370/329 |
| 2016/0330010 | A1* | 11/2016 | Qin | H04L 5/0058 |
| 2017/0302419 | A1* | 10/2017 | Liu | H04L 5/0078 |
| 2020/0314900 | A1 | 10/2020 | Hosseini et al. | |
| 2020/0367261 | A1 | 11/2020 | Huang et al. | |
| 2021/0050955 | A1* | 2/2021 | Park | H04B 7/0456 |

(Continued)

FOREIGN PATENT DOCUMENTS

WO 2020051152 A1 3/2020

OTHER PUBLICATIONS

International Search Report and Written Opinion—PCT/US2021/063628—ISA/EPO—Apr. 8, 2022.

(Continued)

*Primary Examiner* — Chi Ho A Lee
(74) *Attorney, Agent, or Firm* — QUALCOMM Incorporated

(57) ABSTRACT

A user equipment (UE) may partition a plurality of channels including physical uplink control channels (PUCCHs) and physical uplink shared channels (PUSCHs) into two groups, the plurality of channels being scheduled for transmission on a first set of component carriers (CCs) for communicating data and a second set of CCs for communicating control information and data, determine a first subset of PUSCHs of the one or more PUSCHs that is in the second set of CCs, determine that a first PUCCH of the one or more PUCCHs overlaps in time with at least a part of at least one PUSCH of the first subset of PUSCHs, and multiplex the first PUCCH with a first PUSCH of the first subset of PUSCH based on the determination that the first PUCCH overlaps in time with at least a part of the at least one PUSCH.

25 Claims, 13 Drawing Sheets

(56) References Cited

U.S. PATENT DOCUMENTS

| | | | |
|---|---|---|---|
| 2021/0218504 A1* | 7/2021 | Wang | H04L 1/1812 |
| 2021/0243738 A1* | 8/2021 | Islam | H04W 72/23 |
| 2021/0274488 A1* | 9/2021 | Yamamoto | H04L 5/0055 |
| 2023/0029745 A1* | 2/2023 | Cui | H04L 5/0044 |
| 2023/0047603 A1* | 2/2023 | Kim | H04L 5/0051 |
| 2023/0188306 A1* | 6/2023 | Nory | H04W 72/1268 370/330 |
| 2023/0403661 A1* | 12/2023 | Kim | H04W 56/001 |

OTHER PUBLICATIONS

Qualcomm Incorporated: "Summary of Remaining Issues for Overlapping UL Transmissions", 3GPP Draft, 3GPP TSG RAN WG1 Meeting #93, R1-1807820 Summary of Remaining Issues for Overlapping UL Transmissions Version 7, 3rd Generation Partnership Project (3GPP), vol. RAN WG1, No. Busan, Korea; May 21, 2018-May 25, 2018, May 24, 2018, XP051463428, 15 pages, Retrieved from the Internet:URL:http://www.3gpp.org/ftp/tsg%5Fran/WG1%5FRL1/TSGR1%5F93/Docs [retrieved on May 24, 2018].

\* cited by examiner

COLLISION HANDLING FOR PARALLEL UPLINK TRANSMISSION

CROSS REFERENCE TO RELATED APPLICATION(S)

This application claims the benefit of and priority to U.S. Provisional Application Ser. No. 63/138,504, entitled "COLLISION HANDLING FOR PARALLEL UPLINK TRANSMISSION" and filed on Jan. 17, 2021, which is expressly incorporated by reference herein in its entirety.

TECHNICAL FIELD

The present disclosure relates generally to communication systems, and more particularly, to a method of wireless communication including a collision handling for parallel uplink transmission.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE, and the UE may partition a plurality of channels including one or more physical uplink control channels (PUCCHs) and one or more physical uplink shared channels (PUSCHs) into two groups, the plurality of channels being scheduled for transmission on component carriers (CCs) including a first set of CCs for communicating data and a second set of CCs for communicating control information and data, identify a first subset of PUSCHs of the one or more PUSCHs that is in the second set of CCs, and multiplex a first PUCCH of the one or more PUCCHs with a first PUSCH of the first subset of PUSCHs that is in the second set of CCs based on the first PUCCH overlapping in time with at least a part of the at least one PUSCH. The first subset of PUSCHs may be determined based on an indication received from a base station for each CCs indicating whether the CC is for communicating data or communicating control information and data.

In some aspects, the two groups may include a first group including the one or more PUCCHs and a second group including the one or more PUSCHs. The partitioning the plurality of channels may include determining that a second PUCCH of the first group overlaps in time with at least a part of a third PUCCH of the first group, and multiplexing the second PUCCH with the overlapping third PUCCH to generate the first PUCCH. At least one PUSCH may include the first PUSCH with a first order and a second PUSCH with a second order, and the UE may further determine that the first order of the first PUSCH of at least one PUSCH is greater than the second order of the second PUSCH of the at least one PUSCH, and determine the first PUSCH for multiplexing with the first PUCCH from the first subset of PUSCHs based on the determination that the first order of the first PUSCH is greater.

The UE may determine the first subset of PUSCHs by determining a preliminary subset of PUSCHs of the at least one PUSCH that has a channel priority same as the first PUCCH, and the first subset of PUSCHs may be determined from the preliminary subset of PUSCHs that is in the second set of CCs.

In some aspects, the two groups may include a first set of channels and a second set of channels, the first set of channels and the second set of channels having different channel priorities. At least one PUSCH may include the first PUSCH with a first order and a second PUSCH with a second order, and the UE may further determine that the first order of the first PUSCH of at least one PUSCH is greater than the second order of the second PUSCH of the at least one PUSCH, and determining the first PUSCH for multiplexing with the first PUCCH from the first subset of PUSCHs based on the determination that the first order of the first PUSCH is greater.

The UE may resolve channel collision between the first set of channels and the second set of channels having different channel priorities. In one aspect, the UE may determine that the first PUSCH multiplexed with the first PUCCH overlaps in time with at least a part of a third PUSCH of the second set of PUSCHs, the third PUSCH and the first PUSCH multiplexed with the first PUCCH being scheduled for transmission on the same CC, and determine to drop one of the first PUSCH multiplexed with the first PUCCH or the third PUSCH that has a lower channel priority. In another aspect, the UE may determine that the first PUSCH multiplexed with the first PUCCH overlaps in time with at least a part of a fourth PUCCH in the second set of channels and determining to drop one of the first PUSCH multiplexed with the first PUCCH and the fourth PUCCH that has a lower channel priority. In another aspect, the UE may determine that the first PUSCH multiplexed with the first PUCCH overlaps in time with at least a part of a fourth PUCCH in the second set of channels, and multiplex the fourth PUCCH with the first PUSCH multiplexed with the first PUCCH based on the determination that the first PUSCH multiplexed with the first PUCCH overlaps in time with at least a part of a fourth PUCCH. In another aspect, the UE may determine a second subset of PUSCHs of the second set of channels that is in the second set of CCs, determine that a fifth PUCCH, in the first set of channels, that is not overlapping with any PUSCH of the first subset of PUSCHs overlaps in time with at least a part of a third PUSCH of the second set of PUSCHs, and multiplex the fifth PUCCH of the first subset of PUSCHs with the third PUSCH of the second set of PUSCHs based on the determination that the fifth PUCCH overlaps in time with at least a part of the third PUSCH. In another aspect, the UE may determine that a fourth PUCCH in the second set of channels overlaps in time with at least a part of a fifth PUCCH in the first set of channels, and multiplex the fourth PUCCH with the fifth PUCCH based on the determination that the fourth PUCCH overlaps in time with at least a part of a fifth PUCCH.

At least one PUSCH may include the first PUSCH with a first order and a second PUSCH with a second order, and the UE may further determine that the first order of the first PUSCH of at least one PUSCH is greater than the second order of the second PUSCH of the at least one PUSCH, and determine the first PUSCH for multiplexing with the first PUCCH from the first subset of PUSCHs based on the determination that the first order of the first PUSCH is greater.

In one aspect, an order of a PUSCH with scheduled aperiodic channel state information (CSI) may be determined to be greater than an order of a PUSCH without scheduled aperiodic CSI. In another aspect, an order of a PUSCH on a first CC may be determined to be higher than an order of a PUSCH on a second CC based on a first CC index of the first CC being smaller than a second CC index of the second CC.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
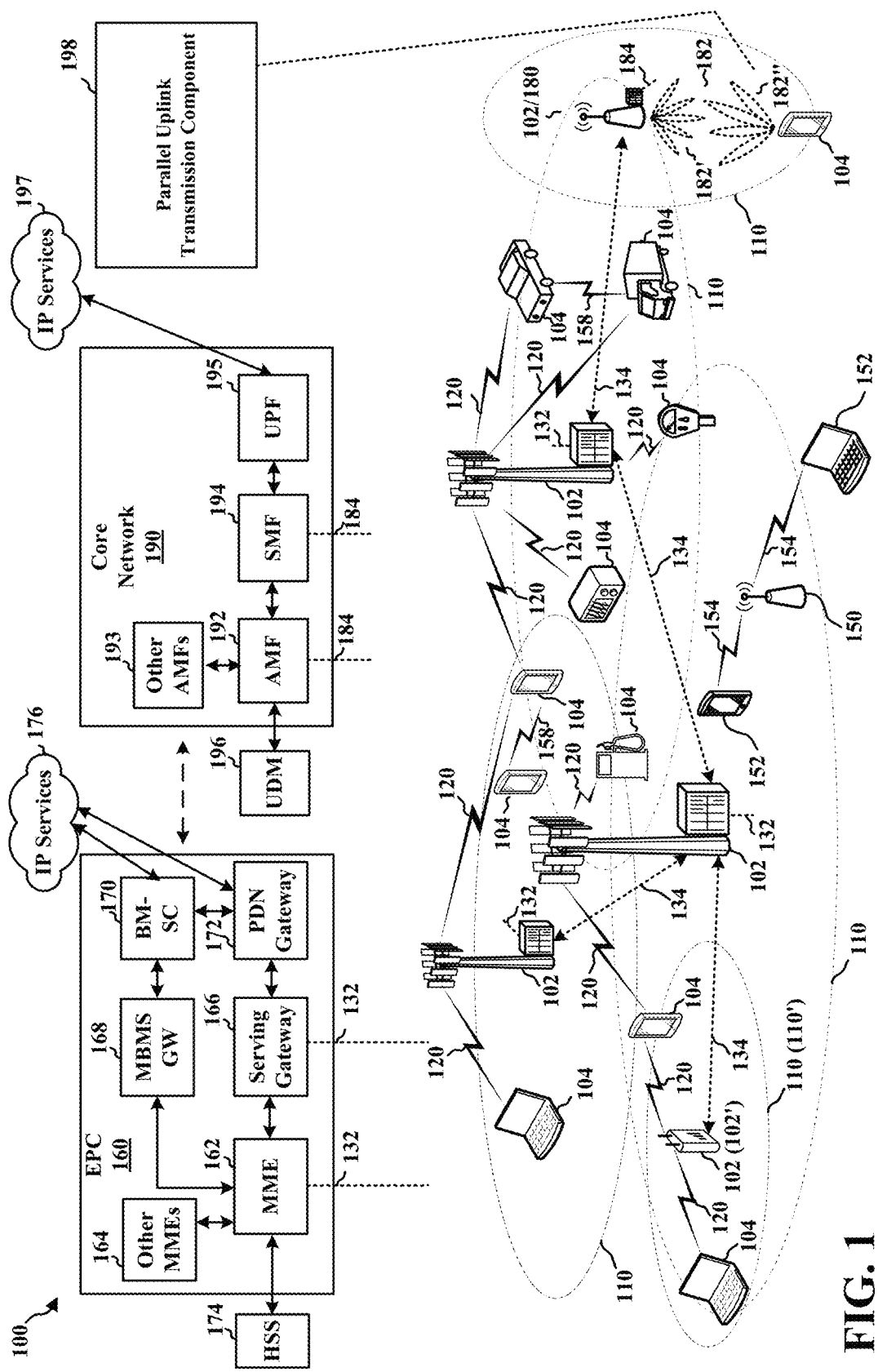
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may a parallel uplink transmission component 198 configured to partition a plurality of channels comprising one or more PUCCHs and one or more PUSCHs into two groups, the plurality of channels being scheduled for transmission on CCs including a first set of CCs for communicating data and a second set of CCs for communicating control information and data, identify a first subset of PUSCHs of the one or more PUSCHs that is in the second set of CCs, and multiplex a first PUCCH of the one or more PUCCHs with a first PUSCH of a first subset of PUSCHs that is in the second set of CCs based on the first PUCCH overlapping in time with at least a part of the at least one PUSCH. Although the following description may be focused on 5G NR, the concepts described herein may be applicable to other similar areas, such as LTE, LTE-A, CDMA, GSM, and other wireless technologies.

Figure 2:
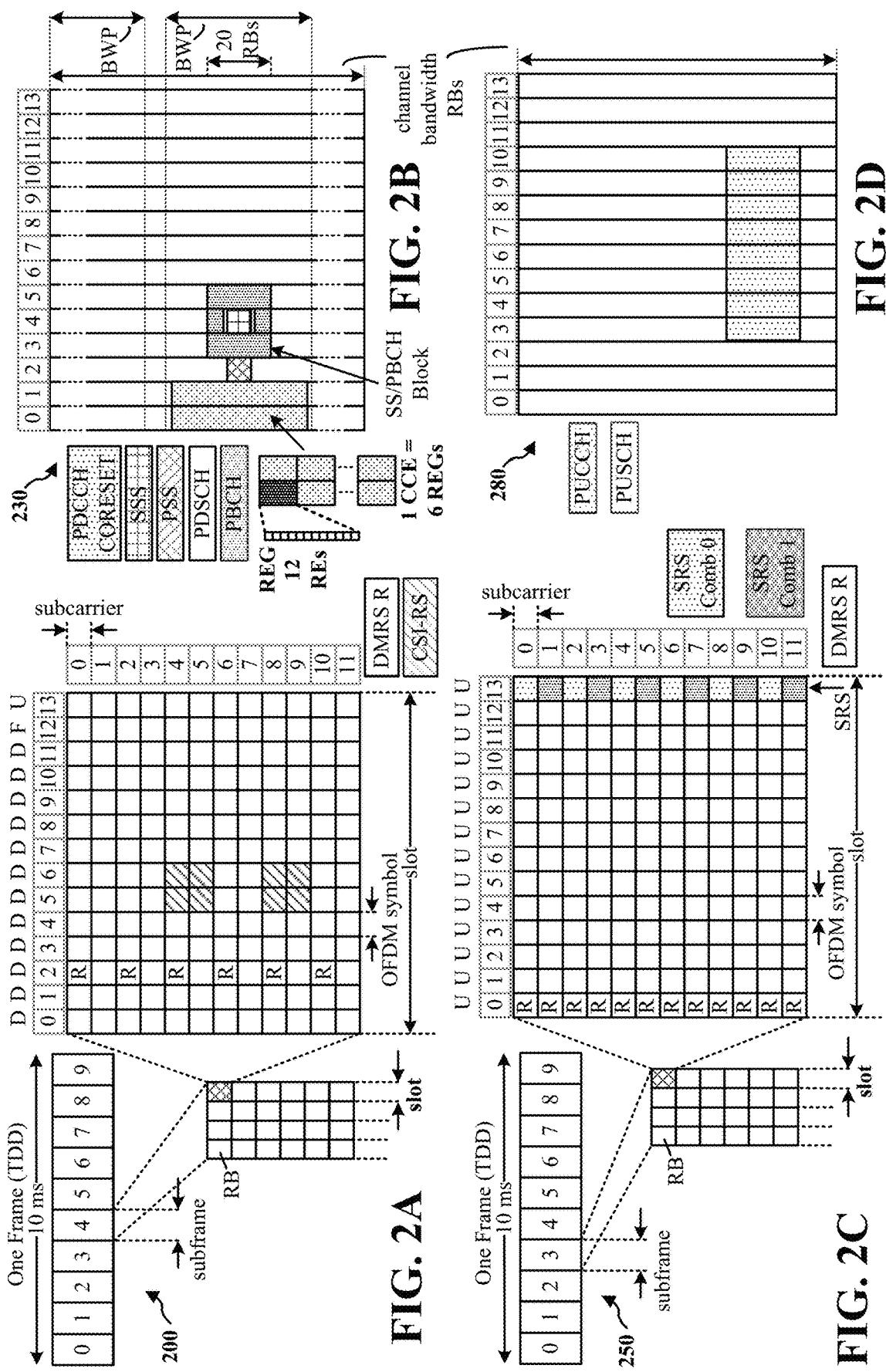
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
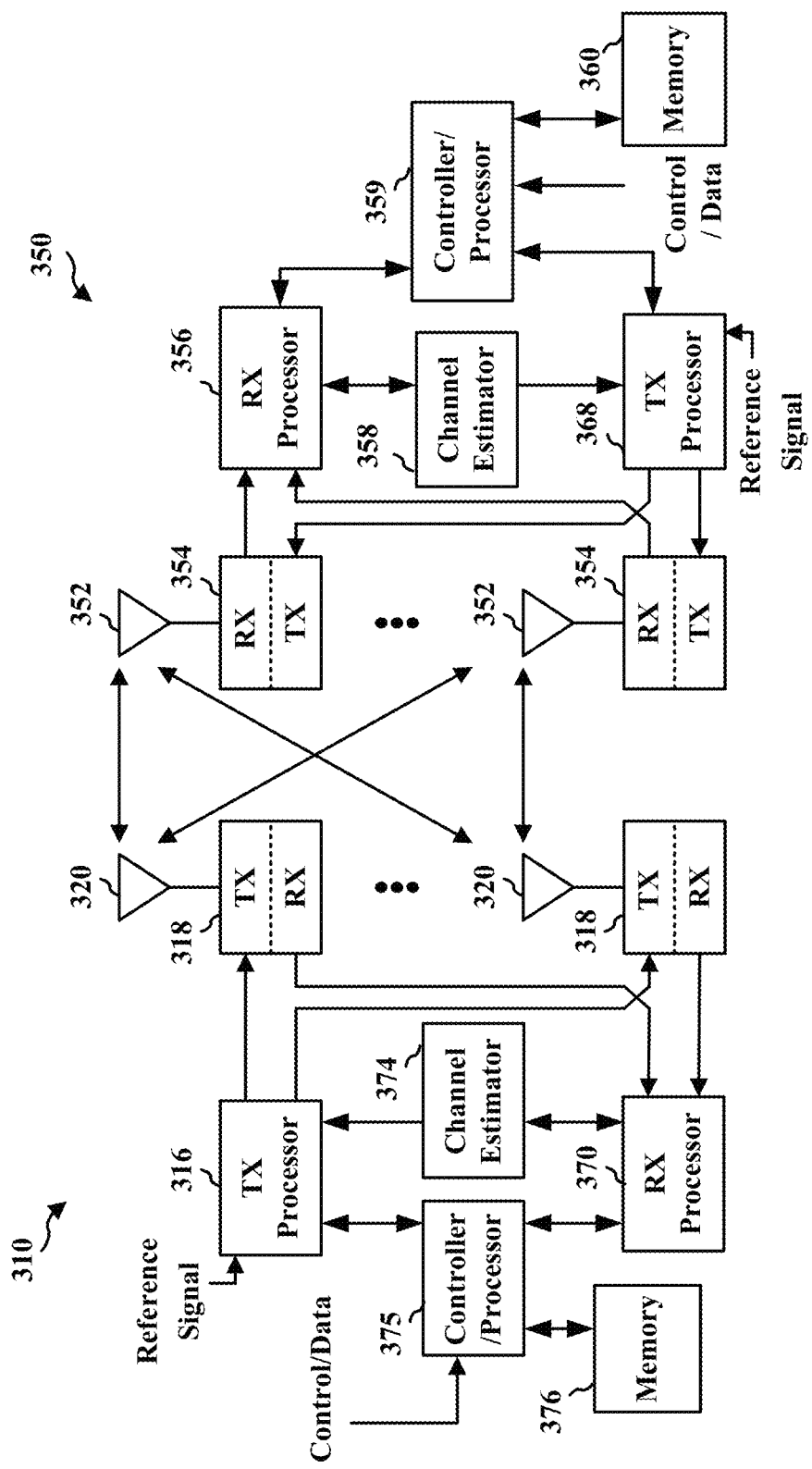
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Figure 4:
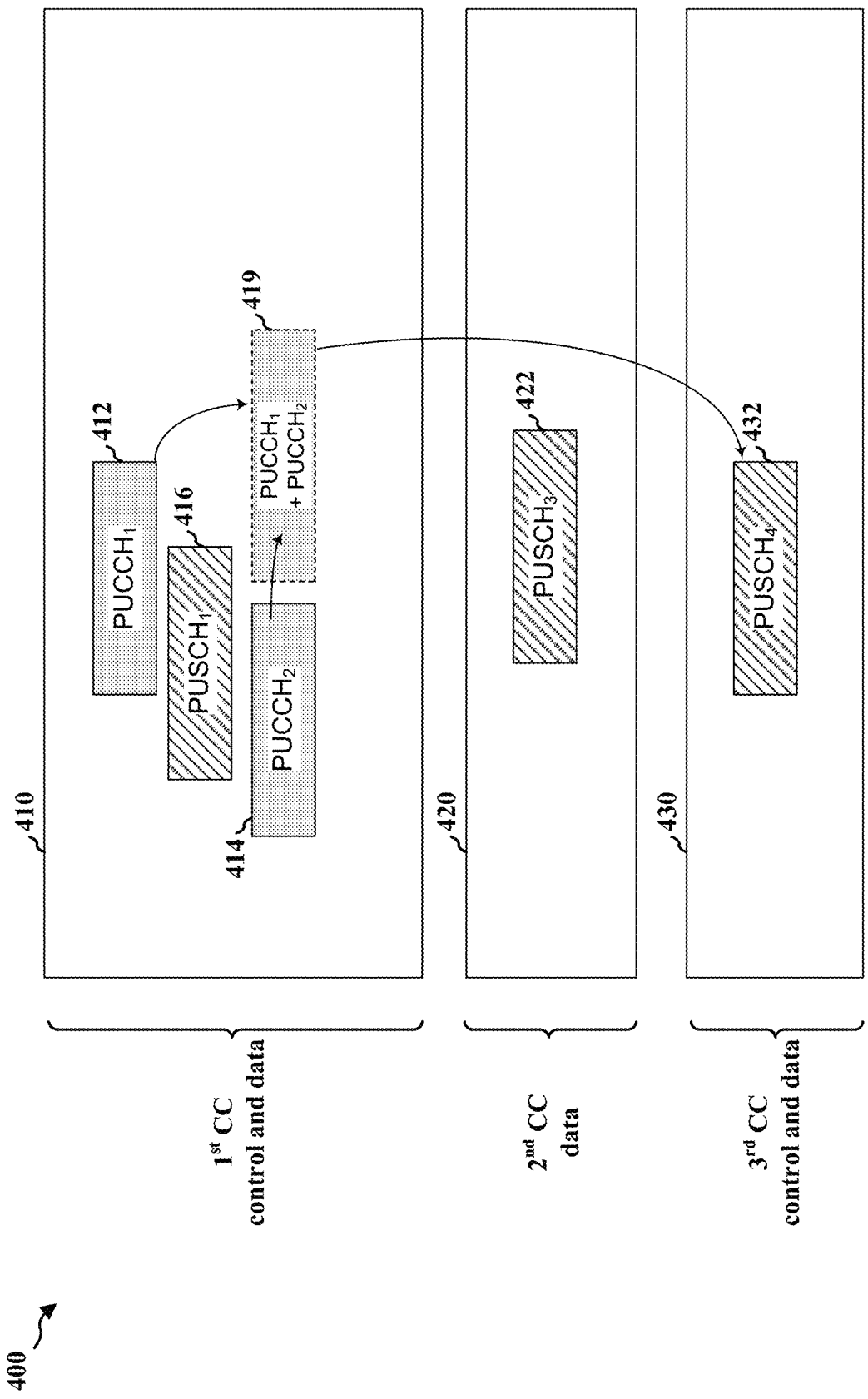
FIG. 4 is a diagram illustrating a method of handling channel collisions for parallel uplink transmission of wireless communication.

FIG. 4 is a diagram 400 illustrating a method of handling channel collisions for parallel uplink transmission of wireless communication. The diagram 400 illustrates example aspects of collision handling in which both the parallel uplink transmission and the first UCI multiplexing scheme may be enabled. The diagram includes a first CC 410 for control information and data transmission, a second CC 420 for data transmission, and a third CC 430 for control information and data transmission, as well as a first PUCCH (PUCCH$_1$) 412, a second PUCCH (PUCCH$_2$) 414, a first PUSCH (PUSCH$_1$) 416 on the first CC 410, a second PUSCH (PUSCH$_2$) 422 on the second CC 420, and a third PUSCH (PUSCH$_3$) 432 on the third CC 430. In some aspects, all the uplink channels may have the same channel priorities.

First, the UE may partition the uplink channels into two groups including group 1 and group 2. Group 1 may include the PUCCH channels including the PUCCH$_1$ 412 and the PUCCH$_2$ 414. Group 2 may include the PUSCH channels including the PUSCH$_1$ 416, the PUSCH$_3$ 422, and the PUSCH$_4$ 432. The UE may first solve the collision within group 1. That is, the UE may first look at group 1 including the PUCCH$_1$ 412 and the PUCCH$_2$ 414. The UE may determine whether the PUCCH$_1$ 412 and the PUCCH$_2$ 414 overlap each other in time. Since the PUCCH$_1$ 412 overlaps in time with at least a part of the PUCCH$_2$ 414, the UE may multiplex the PUCCH$_1$ 412 with the PUCCH$_2$ 414 to form a multiplexed PUCCH 419.

Next, for all the PUCCH of group 1 including the multiplexed PUCCH 419, the UE may sweep over all CCs and list all the PUSCHs which overlap with the PUCCH in the time domain. The CC marked as "data transmission" may be excluded from this list. That is, the UE may generate a subset of PUSCHs that are on the CCs for control information and data transmission and data by excluding the PUSCHs that are on the CCs for data transmission. Here, since the PUSCH$_3$ 422 is on the second CC 420 for data transmission, the UE may exclude the PUSCH$_3$ 422 and determine that the subset of PUSCHs may include the PUSCH$_1$ 416, and the PUSCH$_4$ 432. Also, the UE may determine that the multiplexed PUCCH 419 overlaps with the PUSCH$_1$ 416 and the PUSCH$_4$ 432. The UE may determine with which PUSCH, among a subset of the PUSCHs, the multiplexed PUCCH 419 may piggyback on.

Within the list, the UE may pick a PUSCH based on a certain ordering (or prioritization) rule. In some aspects, the ordering may be referred to as ranking. That is, the UE may determine which of the PUSCH overlapping with the PUCCH has the highest order and determine to multiplex the PUCCH with the PUSCH having the highest order. In some aspects, a highest order may be referred to as a highest rank. The PUCCH may be multiplexed with or piggybacked on the PUSCH with the highest order. That is, the UE may determine that at least one PUSCH of the subset of PUSCHs has a higher order than the other PUSCHs, and multiplex the PUCCH to the PUSCH with the high order. In some aspects, the order of the PUSCH may be preconfigured or predetermined, e.g., determined by various rules. In one aspect, a PUSCH with a scheduled aperiodic CSI may have a higher priority. In another aspect, the PUSCH on the CC with the smallest CC index may have the highest priority.

In FIG. 4, the UE may determine that the $PUSCH_3$ 432 has the highest order, and multiplex the multiplexed PUCCH 419 with the $PUSCH_3$ 432. Accordingly, the $PUCCH_1$ 412 and the $PUCCH_2$ 414 may be multiplexed with the $PUSCH_4$ 432, and the UE may transmit the $PUSCH_1$ 416 on the first CC, the $PUSCH_3$ 422 on the second CC, and the $PUSCH_4$ 432 multiplexed with $PUCCH_1$ 412 and the $PUCCH_2$ 414, resolving the PUCCH and PUSCH collision in the parallel uplink transmission.

Figure 5:
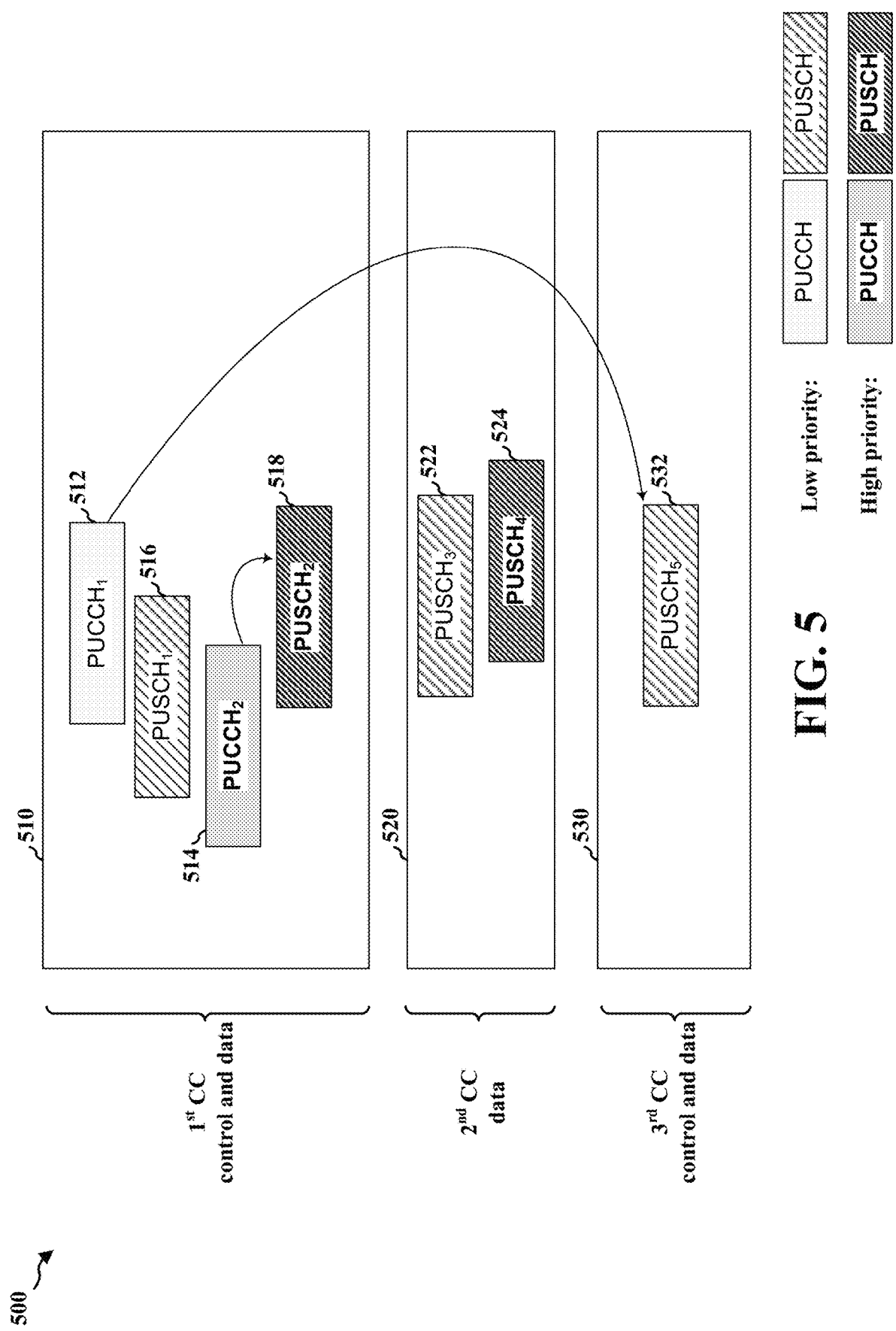
FIG. 5 a diagram illustrating a method of handling channel collisions for parallel uplink transmission of wireless communication.

FIG. 5 is a diagram 500 illustrating a method of handling channel collisions for parallel uplink transmission of wireless communication. The diagram 500 illustrates example aspects of a collision handling having both the parallel uplink transmission and the second UCI multiplexing scheme enabled. The diagram may include a first CC 510 for control information and data transmission, a second CC 520 for data transmission, and a third CC 530 for control information and data transmission, and a first PUCCH ($PUCCH_1$) 512, a second PUCCH ($PUCCH_2$) 514, a first PUSCH ($PUSCH_1$) 516, and a second PUSCH ($PUSCH_2$) 518 on the first CC 510, a third PUSCH ($PUSCH_3$) 522 and a fourth PUSCH ($PUSCH_4$) 524 on the second CC 520, and a fifth PUSCH ($PUSCH_5$) 532 on the third CC 530. The uplink channels may have different channel priorities. That is, the $PUCCH_1$ 512, the $PUSCH_1$ 516, the $PUSCH_3$ 522, and the $PUSCH_5$ 532 may have low channel priority, and the $PUCCH_2$ 514, the $PUSCH_2$ 518, and the $PUSCH_4$ 524 may have the high channel priority.

First, the UE may partition the channels into two groups including group 1 and group 2. Group 1 may include the uplink channels with the high channel priority, and group 2 may include the uplink channels with the low channel priority. Here, group 1 may include the $PUCCH_2$ 514, the $PUSCH_2$ 518, and the $PUSCH_4$ 524, and group 2 may include the $PUCCH_1$ 512, the $PUSCH_1$ 516, the $PUSCH_3$ 522, and the $PUSCH_5$ 532.

Next, within each group, for each PUCCH, the UE may sweep over all the CCs and list all the PUSCHs which overlap in time with the PUCCH in the time domain. The CC marked as "data CC" may be excluded from this list. That is, the UE may generate a preliminary subset of the PUSCHs that are in the group and generate the subset of the PUSCHs candidates with which each PUCCH may multiplex.

Here, in group 1, since the $PUSCH_4$ 524 is on the second CC 520 for data transmission, the UE may exclude the $PUSCH_4$ 524 and determine that the subset of PUSCHs for the $PUCCH_2$ 514 may include the $PUSCH_2$ 518. In group 2, since the $PUSCH_3$ 522 is on the second CC 520 for data transmission, the UE may exclude the $PUSCH_3$ 522 and determine that the subset of PUSCHs for the $PUCCH_1$ 512 may include the $PUSCH_1$ 516 and the $PUSCH_5$ 532.

Within the list, the UE may select a PUSCH based on a certain order (or prioritization). That is, the UE may determine which of the PUSCH overlapping with the PUCCH has the highest order and determine to multiplex the PUCCH with the PUSCH having the highest order. The PUCCH may be multiplexed with or piggybacked on the PUSCH with the highest order. That is, the UE may determine that at least one PUSCH of the subset of PUSCHs has a higher order than the other PUSCHs, and multiplex the PUCCH to the PUSCH with the high order. In some aspects, the order of the PUSCH may be determined by various rules. In one aspect, a PUSCH with a scheduled aperiodic CSI may have a higher priority. In another aspect, the PUSCH on the CC with the smallest CC index may have the highest priority.

Here, for group 1, the UE may determine that the $PUCCH_2$ 514 overlaps in time with the $PUSCH_2$ 518 and multiplex the $PUCCH_2$ 514 with the $PUSCH_2$ 518. For group 2, the UE may determine that the $PUCCH_1$ 512 overlaps in time with the $PUSCH_1$ 516 and the $PUSCH_5$ 532 and determine that the $PUSCH_5$ 532 has a higher order over the $PUSCH_1$ 516. The UE may multiplex the $PUCCH_1$ 512 with the $PUSCH_5$ 532.

Finally, the UE may resolve the collision within each CC and between different CCs. After resolving the collisions within each group, the UE may check across the two groups. For collision of channels with different channel priority, the UE may transmit the channel with the high channel priority and drop the transmission of the channel with the low channel priority, except if both channels are PUSCH and they are on different CCs. Two PUSCH that are on different CCs may be transmitted simultaneously.

Here, through the collision resolving within group 1 and group 2, the $PUCCH_1$ 512 is multiplexed with the $PUSCH_5$ 532 and the $PUCCH_2$ 514 is multiplexed with the $PUSCH_2$ 518. Accordingly, the UE may now have the $PUSCH_1$ 516, the $PUSCH_2$ 518 multiplexed with the $PUCCH_2$ 514, the $PUSCH_3$ 522, the $PUSCH_4$ 524, and the $PUSCH_5$ 532 multiplexed with the $PUCCH_1$ 512. In the first CC 510, the $PUSCH_1$ 516 has a low channel priority, and the $PUSCH_2$ 518 multiplexed with the $PUCCH_2$ 514 has a high channel priority, and the UE may drop the transmission of the $PUSCH_1$ 516. In the second CC 520, the $PUSCH_3$ 522 has a low channel priority, and the $PUSCH_4$ 524 has a high channel priority, and the UE may drop the transmission of the $PUSCH_4$ 524. Therefore, the UE may transmit the $PUSCH_2$ 518 multiplexed with the $PUCCH_2$ 514 on the first CC 510, the $PUSCH_4$ 524 on the second CC 520, and the $PUSCH_5$ 532 multiplexed with the $PUCCH_1$ 512 on the third CC 530 and resolve the PUCCH and PUSCH collision in the parallel uplink transmission.

Figure 6:
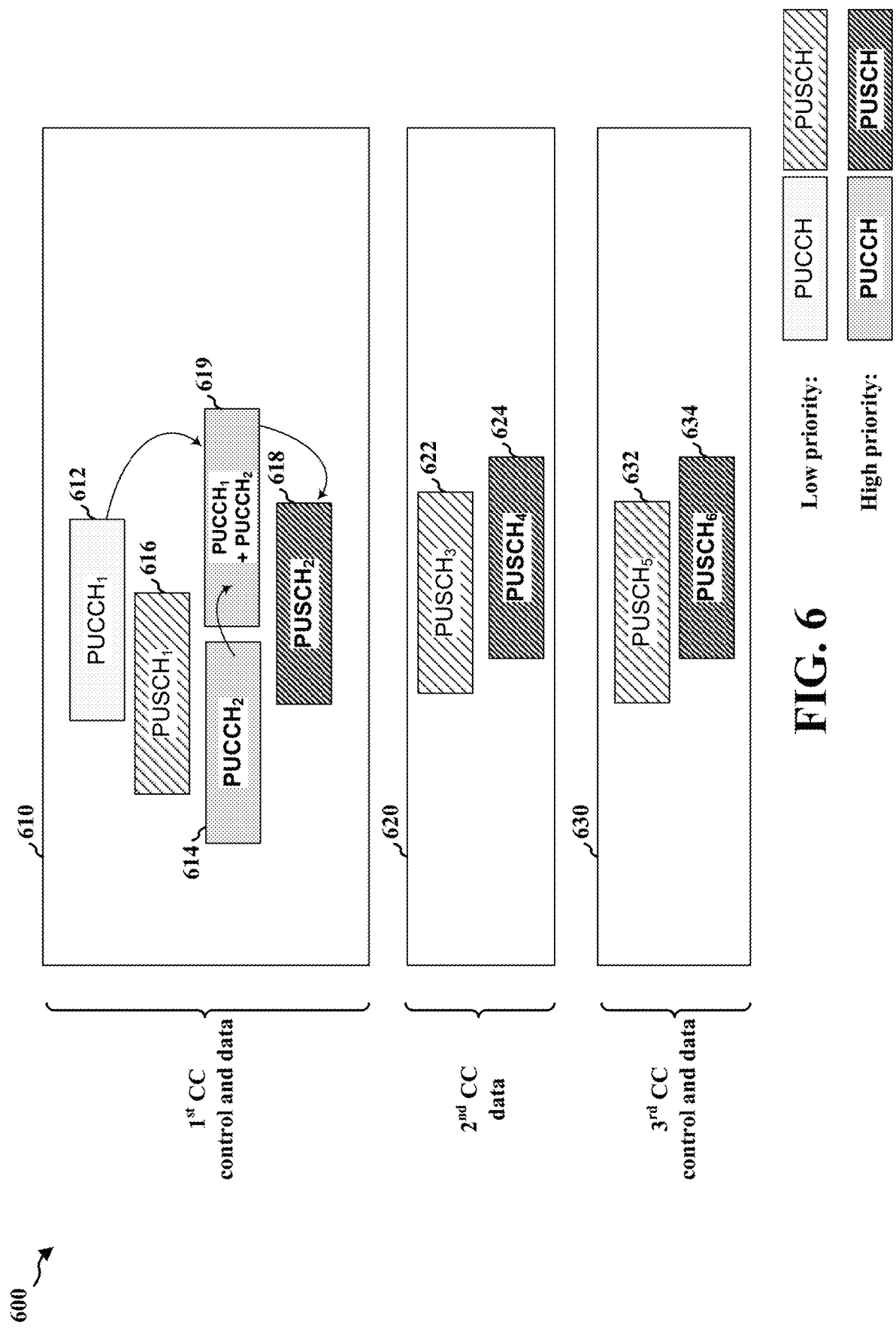
FIG. 6 a diagram illustrating a method of handling channel collisions for parallel uplink transmission of wireless communication.

FIG. 6 is a diagram 600 illustrating a method of handling channel collisions for parallel uplink transmission of wireless communication. The diagram 600 may illustrate a collision handling including both the parallel uplink transmission and the third UCI multiplexing scheme enabled on top of the first UCI multiplexing scheme. The diagram may include a first CC 610 for control information and data transmission, a second CC 620 for data transmission, and a third CC 630 for control information and data transmission, and a first PUCCH ($PUCCH_1$) 612, a second PUCCH ($PUCCH_2$) 614, a first PUSCH ($PUSCH_1$) 616, and a second PUSCH ($PUSCH_2$) 618 on the first CC 610, a third PUSCH ($PUSCH_3$) 622 and a fourth PUSCH ($PUSCH_4$) 624 on the second CC 620, a fifth PUSCH ($PUSCH_5$) 632 and a sixth PUSCH ($PUSCH_6$) 634 on the third CC 630. The uplink channels may have different channel priorities. That is, the $PUCCH_1$ 612, the $PUSCH_1$ 616, the $PUSCH_3$ 622, and the $PUSCH_5$ 632 may have low channel priority, and the $PUCCH_2$ 614, the $PUSCH_2$ 618, the $PUSCH_4$ 624, and the $PUSCH_6$ 634 may have the high channel priority.

First, the UE may partition the uplink channels into two groups including group 1 and group 2. Group 1 may include the PUCCH channels including the $PUCCH_1$ 612 and the $PUCCH_2$ 614. Group 2 may include the PUSCH channels including the $PUSCH_1$ 616, the $PUSCH_2$ 618, the $PUSCH_2$ 622, the $PUSCH_4$ 624, the $PUSCH_5$ 632, and the $PUSCH_6$ 634. The UE may first solve the collision within group 1 first. That is, the UE may first look at group 1 including the $PUCCH_1$ 612 and the $PUCCH_2$ 614. The UE may determine whether the PUCCH$_1$ 612 and the PUCCH$_2$ 614 overlap each other in time. Since the PUCCH$_1$ 612 overlaps in time with at least a part of the PUCCH$_2$ 614, the UE may multiplex the PUCCH$_1$ 612 with the PUCCH$_2$ 614 to a multiplexed PUCCH 619.

Next, for all the PUCCH of group 1 including the multiplexed PUCCH 419, based on the priority level of the PUCCH (either high or low), the UE may sweep over all CCs and list all the PUSCHs with the same priority which overlap with the PUCCH in the time domain. The CC marked as "data transmission" may be excluded from this list. That is, the UE may, for each PUCCH, generate a preliminary subset of PUSCHs that has the same channel priority as the corresponding PUCCH. From the preliminary subset of PUSCHs, the UE may generate a subset of PUSCHs that are on the CCs for control information and data transmission and data by excluding the PUSCHs that are on the CCs for data transmission.

Here, the multiplexed PUCCH 619 has a high channel priority, so the preliminary subset of PUSCHs may include the PUSCHs with high priority, including the PUSCH$_2$ 618, the PUSCH$_4$ 624, and the PUSCH$_6$ 634. From the preliminary subset of PUSCHs, since the PUSCH$_4$ 624 is on the second CC 620 for data transmission, the UE may exclude the PUSCH$_4$ 624 and determine that the subset of PUSCHs may include the PUSCH$_2$ 618 and the PUSCH$_6$ 634. The UE may determine that the multiplexed PUCCH 619 overlaps with the PUSCH$_2$ 618 and the PUSCH$_6$ 634. The UE may determine with which PUSCH, among a subset of the PUSCHs, the multiplexed PUCCH 619 may piggyback on.

The UE may select a PUSCH based on a certain order (or prioritization). That is, the UE may determine which of the PUSCH overlapping with the PUCCH has the highest order and determine to multiplex the PUCCH with the PUSCH having the highest order. The PUCCH may be multiplexed with or piggybacked on the PUSCH with the highest order. That is, the UE may determine that at least one PUSCH of the subset of PUSCHs has a higher order than the other PUSCHs, and multiplex the PUCCH to the PUSCH with the high order. In some aspects, the order of the PUSCH may be determined by various rules. In one aspect, a PUSCH with a scheduled aperiodic CSI may have a higher priority. In another aspect, the PUSCH on the CC with the smallest CC index may have the highest priority.

Here, the UE may determine that the PUSCH$_2$ 618 has a higher order over the PUSCH$_6$ 634 and multiplex the multiplexed PUCCH 619 with the PUSCH$_2$ 618. Accordingly, the PUCCH$_1$ 612 and the PUCCH$_2$ 614 may be multiplexed with the PUSCH$_2$ 618. Accordingly, the UE may now have the PUSCH$_1$ 616, the PUSCH$_2$ 618 multiplexed with the PUCCH$_1$ 612 and the PUCCH$_2$ 614 on the first CC 610, the PUSCH$_3$ 622 and the PUSCH$_4$ 624 on the second CC 620, and the PUSCH$_5$ 632 and the PUSCH$_6$ 634 on the third CC 630. In the first CC 610, the PUSCH$_1$ 616 has a low channel priority, so UE may drop the transmission of the PUSCH$_1$ 616 and transmit the PUSCH$_2$ 618 multiplexed with the PUCCH$_1$ 612 and the PUCCH$_2$ 614. In the second CC 620, the PUSCH$_3$ 622 has a low channel priority, so UE may drop the transmission of the PUSCH$_3$ 622 and transmit the PUSCH$_4$ 624. In the third CC 630, the PUSCH$_5$ 632 has a low channel priority, so UE may drop the transmission of the PUSCH$_5$ 632 and transmit the PUSCH$_6$ 634. Accordingly, the UE may resolve the PUCCH and PUSCH collision in the parallel uplink transmission.

Figure 7:
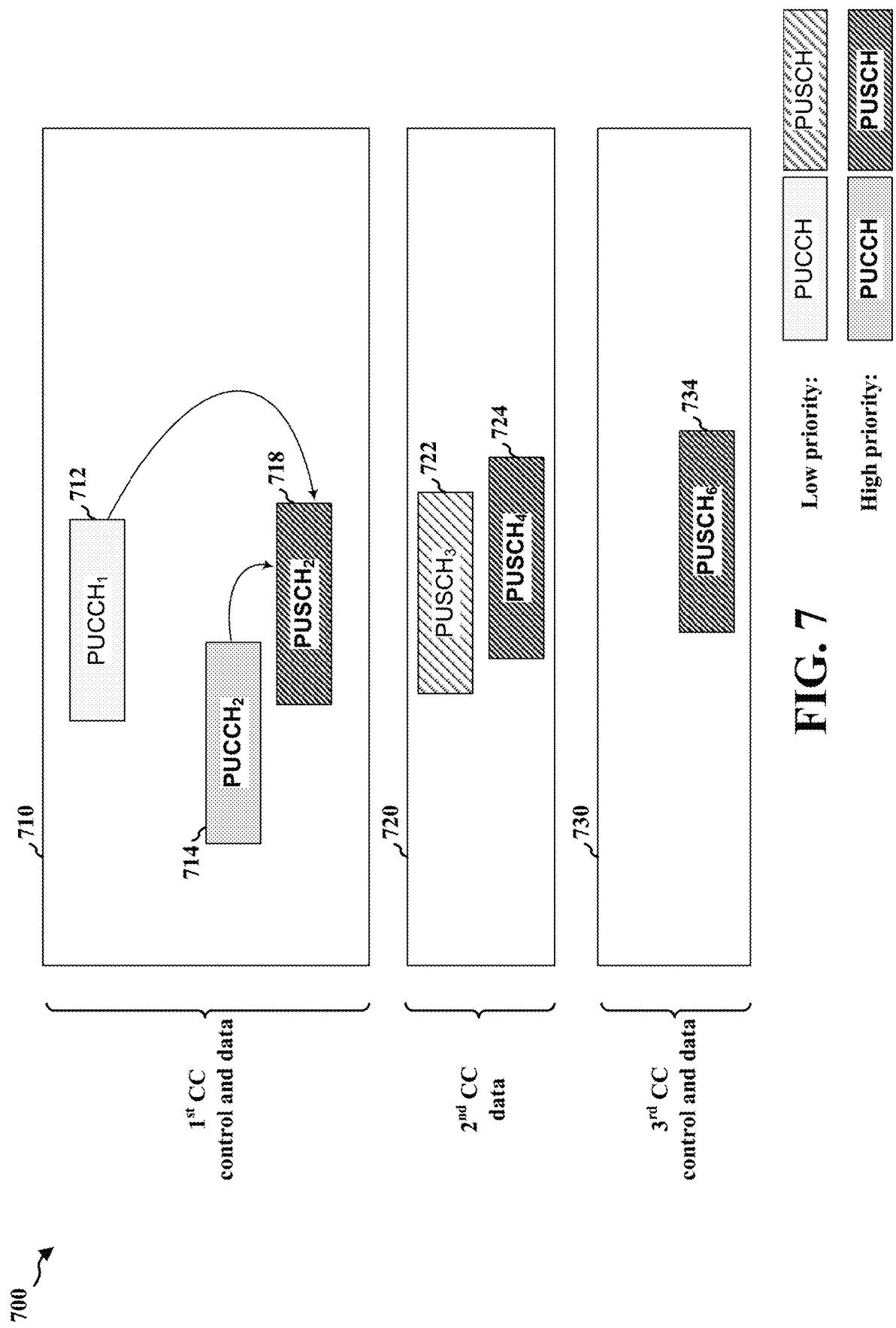
FIG. 7 a diagram illustrating a method of handling channel collisions for parallel uplink transmission of wireless communication.

FIG. 7 is a diagram 700 illustrating a method of handling channel collisions for parallel uplink transmission of wireless communication. The diagram 700 may illustrate a collision handling including both the parallel uplink transmission and the third UCI multiplexing scheme enabled on top of the second UCI multiplexing scheme. The diagram may include a first CC 710 for control information and data transmission, a second CC 720 for data transmission, and a third CC 730 for control information and data transmission, and a first PUCCH (PUCCH$_1$) 712, a second PUCCH (PUCCH$_2$) 714, and a second PUSCH (PUSCH$_2$) 718 on the first CC 710, a third PUSCH (PUSCH$_3$) 722 and a fourth PUSCH (PUSCH$_4$) 724 on the second CC 720, and a sixth PUSCH (PUSCH$_6$) 734 on the third CC 730. The uplink channels may have different channel priorities. That is, the PUCCH$_1$ 712 and the PUSCH$_3$ 722 may have a low channel priority, and the PUCCH$_2$ 714, the PUSCH$_2$ 718, the PUSCH$_4$ 724, and the PUSCH$_6$ 734 may have a high channel priority.

First, the UE may partition the channels into two groups including group 1 and group 2. Group 1 may include the uplink channels with a high channel priority, and group 2 may include the uplink channels with a low channel priority. Here, group 1 may include the PUCCH$_2$ 714, the PUSCH$_2$ 718, the PUSCH$_4$ 724, and the PUSCH$_6$ 734, and group 2 may include the PUCCH$_1$ 712 and the PUSCH$_3$ 722.

Next, within each group, for each PUCCH, the UE may sweep over all the CCs and list all the PUSCHs which overlap in time with the PUCCH in the time domain. The CC marked as "data CC" may be excluded from this list. That is, the UE may generate a preliminary subset of the PUSCHs that are in a group and generate the subset of the PUSCHs candidates with which each PUCCH may multiplex.

Here, in group 1, since the PUSCH$_4$ 724 is on the second CC 720 for data transmission, the UE may exclude the PUSCH$_4$ 724 and determine that the subset of PUSCHs for the PUCCH$_2$ 714 may include the PUSCH$_2$ 718 and the PUSCH$_6$ 734. In group 2, since the PUSCH$_3$ 722 is on the second CC 720 for data transmission, the UE may exclude the PUSCH$_3$ 722 and determine that the subset of PUSCHs for the PUCCH$_1$ 712 includes no candidate.

Within the list, the UE may select a PUSCH based on a certain order (or prioritization). That is, the UE may determine which of the PUSCH overlapping with the PUCCH has the highest order and determine to multiplex the PUCCH with the PUSCH having the highest order. The PUCCH may be multiplexed with or piggybacked on the PUSCH with the highest order. That is, the UE may determine that at least one PUSCH of the subset of PUSCHs has a higher order than the other PUSCHs, and multiplex the PUCCH to the PUSCH with the high order. In some aspects, the order of the PUSCH may be preconfigured or predetermined, e.g., determined by various rules. In one aspect, a PUSCH with a scheduled aperiodic CSI may have a higher priority. In another aspect, the PUSCH on the CC with the smallest CC index may have the highest priority.

Here, for group 1, the UE may determine that the PUCCH$_2$ 714 overlaps in time with the PUSCH$_2$ 718 and the PUSCH$_6$ 734 and determine that the PUSCH$_2$ 718 has a higher order than the PUSCH$_6$ 734. The UE may multiplex the PUCCH$_2$ 714 with the PUSCH$_2$ 718. For group 2, the UE may determine that the PUCCH$_1$ 712 has no PUSCH candidate within group 2.

Finally, the UE may resolve the collision within each CC and between different CCs. After resolving collision within each group, the UE may check across the two groups for overlapping of channels with a different priority. If a PUCCH overlaps with PUCCHs with a different priority, the UE may multiplex the overlapping PUCCHs. If a PUSCH overlaps with a PUSCH with a different channel priority on the same CC, the UE may drop the transmission of the low priority PUSCH. If the overlapping PUSCHs are on different CCs, the UE may transmit the overlapping PUSCHs simultaneously. If a PUCCH overlaps with PUSCHs with a different channel priority, the UE may multiplex the PUCCH with the PUSCHs with a different channel priority after excluding the CC marked as "data transmission." The UE may follow the same procedure of generating the subset of the PUSCHs and selecting one PUSCH from the subset of the PUSCHs based on the order of the PUSCHs.

Here, the UE may have the $PUCCH_1$ 712 and the $PUSCH_2$ 718 multiplexed with the $PUCCH_2$ 714 on the first CC 710, the $PUSCH_3$ 722 and the $PUSCH_4$ 724 on the second CC 720, and the $PUSCH_6$ 734 on the third CC 730. For the $PUCCH_1$ 712, the UE may determine that the $PUSCH_3$ 722 and the $PUSCH_4$ 724 are on the second CC 720 for data transmission and that the subset of PUSCHs for the $PUCCH_1$ 712 may include the $PUSCH_2$ 718 multiplexed with the $PUCCH_2$ 714 and the $PUSCH_6$ 734. The UE may determine that the $PUCCH_1$ 712 overlaps with the $PUSCH_2$ 718 multiplexed with the $PUCCH_2$ 714 and the $PUSCH_6$ 734. The UE may determine that the $PUSCH_2$ 718 multiplexed with the $PUCCH_2$ 714 has a higher order than the $PUSCH_6$ 734, and the UE may multiplex the $PUCCH_1$ 712 with the $PUSCH_2$ 718 multiplexed with the $PUCCH_2$ 714.

Accordingly, the UE may now have the $PUSCH_2$ 718 multiplexed with the $PUCCH_1$ 712 and the $PUCCH_2$ 714 on the first CC 710, the $PUSCH_3$ 722, and the $PUSCH_4$ 724 on the second CC 720, and the $PUSCH_6$ 734 on the third CC 730. For the second CC 720, the $PUSCH_3$ 722 has a low channel priority, so the UE may drop the transmission of the $PUSCH_3$ 722 and transmit the $PUSCH_4$ 724. Therefore, the UE may transmit the $PUSCH_2$ 718 multiplexed with the $PUCCH_1$ 712 and the $PUCCH_2$ 714 on the first CC 710, the $PUSCH_4$ 724 on the second CC 720, and the $PUSCH_6$ 734 on the third CC 730. Accordingly, the UE may resolve the PUCCH and PUSCH collision in the parallel uplink transmission.

Figure 8:
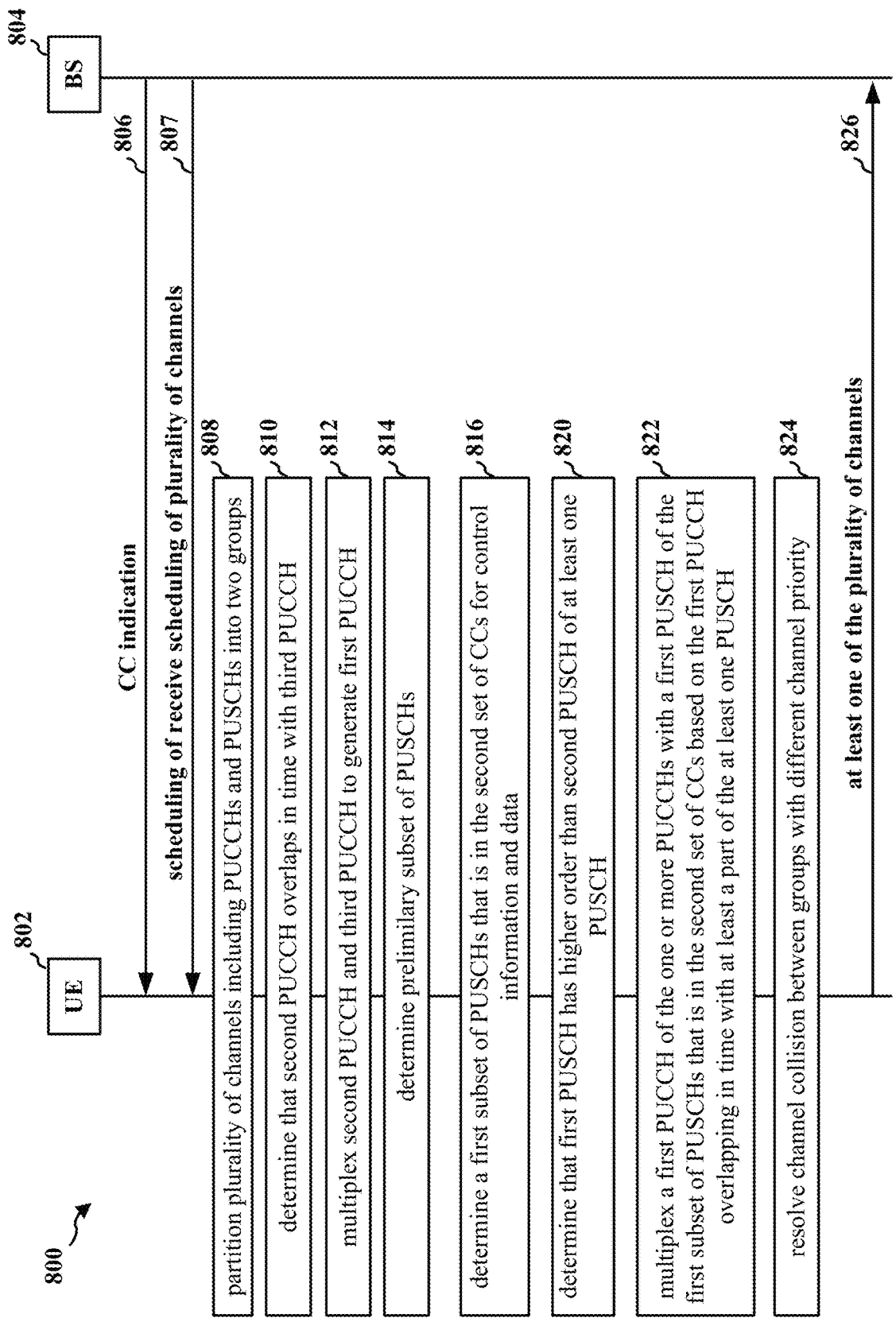
FIG. 8 is a communication chart of a method of wireless communication.

FIG. 8 is a communication chart 800 of a method of wireless communication. The communication chart 800 may include a UE 802 and a base station 804. A UE 802 may partition a plurality of channels including PUCCHs and PUSCHs into two groups, the plurality of channels being scheduled for transmission on a first set of CCs for communicating data and a second set of CCs for communicating control information and data, determine a first subset of PUSCHs of the one or more PUSCHs that is in the second set of CCs, determine that a first PUCCH of the one or more PUCCHs overlaps in time with at least a part of at least one PUSCH of the first subset of PUSCHs, and multiplex the first PUCCH with a first PUSCH of the first subset of PUSCH based on the determination that the first PUCCH overlaps in time with at least a part of the at least one PUSCH.

At 806, the base station 804 may transmit, to the UE 802, an indication of CCs including a first set of CCs for communicating data and a second set of CCs for communicating control information and data. The UE 802 may receive, from the base station 804, an indication of CCs including a first set of CCs for communicating data and a second set of CCs for communicating control information and data. Here, a signal indicating the CCs may indicate which CC supports the parallel uplink transmission. That is, the signal may indicate a first set of CCs for communicating data and a second set of CCs for communicating control information and data.

At 807, the base station 804 may transmit, to the UE 802, an instruction scheduling a plurality of channels for transmission on the CCs including the first set of CCs for communicating data and the second set of CCs for communicating control information and data. That UE 802 may receive, from the base station 804, an instruction scheduling a plurality of channels for transmission on the CCs including the first set of CCs for communicating data and the second set of CCs for communicating control information and data. That is, the plurality of channels may include one or more PUCCHs and one or more PUSCHs. In one aspect, the one or more PUCCHs may be schedule to be transmitted on the first set of CCs or the second set of CCs, and the one or more PUSCHs may be scheduled to be transmitted on the second set of CCs.

At 808, the UE 802 may partition the plurality of channels including the one or more PUCCHs and the one or more PUSCHs into two groups, the plurality of channels being scheduled for transmission on CCs including the first set of CCs for communicating data and the second set of CCs for communicating control information and data. In one aspect, the two groups may include a first group including the one or more PUCCHs and a second group including the one or more PUSCHs. In another aspect, the two groups may include a first set of channels and a second set of channels having different channel priorities.

At 810, based on the plurality of channels being partitioned into two groups including the first group including the one or more PUCCHs and the second group including the one or more PUSCHs at 808, the UE 802 may determine that a second PUCCH of the first group overlaps in time with at least a part of a third PUCCH of the first group.

At 812, based on determining that the second PUCCH of the first group overlaps in time with at least a part of the third PUCCH of the first group at 810, the UE 802 may multiplex the second PUCCH with the overlapping third PUCCH to generate the first PUCCH.

At 814, the UE 802 may determine a preliminary subset of PUSCHs of at least one PUSCH that has a channel priority same as the first PUCCH. That is, the UE 802 may, for each PUCCH, generate a preliminary subset of PUSCHs that has the same channel priority as the corresponding PUCCH. From the preliminary subset of PUSCHs, the UE 802 may generate a subset of PUSCHs that are on the CCs for control information and data transmission and data by excluding the PUSCHs that are on the CCs for data transmission.

At 816, the UE 802 may determine a first subset of PUSCHs of the one or more PUSCHs that is in the second set of CCs. The first subset of PUSCHs may be determined based on the indication received from the base station 804 at 806 for each CCs indicating whether the CC is for communicating data or communicating control information and data. In one aspect, the first subset of PUSCHs may be determined from the preliminary subset of PUSCHs that is in the second set of CCs, as determined at 814.

At 820, a first PUCCH of the one or more PUCCHs may overlap in time with at least a part of at least one PUSCH of the first subset of PUSCHs and the at least one PUSCH may include the first PUSCH with a first order and a second PUSCH with a second order, and the UE 802 may determine that the first order of the first PUSCH of at least one PUSCH is greater than the second order of the second PUSCH of the at least one PUSCH, and determine a first PUSCH for multiplexing with the first PUCCH from the first subset of PUSCHs based on the determination that the first order of the first PUSCH is greater.

In one aspect, the first order of the first PUSCH with scheduled aperiodic CSI may be determined to be greater than the second order of the second PUSCH without scheduled aperiodic CSI. In another aspect, the first order of the first PUSCH on a first CC may be higher than the second order of the second PUSCH on a second CC based on a first CC index of the first CC being smaller than a second CC index of the second CC.

At 822, the UE 802 may multiplex the first PUCCH with the first PUSCH of the first subset of PUSCH based on the determination that the first PUCCH overlaps in time with at least a part of the at least one PUSCH.

At 824, the UE 802 may resolve channel collision between the first set of channels and the second set of channels having different channel priorities. In one aspect, if channels with a different priority collide, the UE 802 may transmit the channel with the high channel priority and drop the channel with the low channel priority, except if both the high priority channel and the low priority channel are PUSCH on different CCs, where the UE 802 may transmit them simultaneously. That is, the UE 802 may determine that the first PUSCH multiplexed with the first PUCCH overlaps in time with at least a part of a third PUSCH of the second set of PUSCHs, the third PUSCH and the first PUSCH multiplexed with the first PUCCH being scheduled for transmission on the same CC and determine to drop one of the first PUSCH multiplexed with the first PUCCH or the third PUSCH that has a lower channel priority. In another aspect, the UE 802 may determine that the first PUSCH multiplexed with the first PUCCH overlaps in time with at least a part of a fourth PUCCH in the second set of channels and determine to drop one of the first PUSCH multiplexed with the first PUCCH and the fourth PUCCH that has a lower channel priority.

In another aspect, if a PUCCH overlaps with PUSCHs with a different priority than the PUCCH, the UE 802 may follow the procedures at 820 and/or 822. That is, the UE 802 may determine that the first PUSCH multiplexed with the first PUCCH overlaps in time with at least a part of a fourth PUCCH in the second set of channels, and multiplex the fourth PUCCH with the first PUSCH multiplexed with the first PUCCH based on the determination that the first PUSCH multiplexed with the first PUCCH overlaps in time with at least a part of a fourth PUCCH. In another aspect, the UE 802 may determine a second subset of PUSCHs of the second set of channels that is in the second set of CCs, determine that a fifth PUCCH in the first set of channels that is not overlapping with any PUSCH of the first subset of PUSCHs overlaps in time with at least a part of a third PUSCH of the second set of PUSCHs, and multiplex the fifth PUCCH of the first subset of PUSCHs with the third PUSCH of the second set of PUSCHs based on the determination that the fifth PUCCH overlaps in time with at least a part of the third PUSCH.

In another aspect, when a PUCCH overlaps with PUCCHs, with a different priority than the PUCCH, the UE 802 may multiplex these PUCCHs. That is, the UE 802 may determine that a fourth PUCCH in the second set of channels overlaps in time with at least a part of a fifth PUCCH in the first set of channels, and multiplex the fourth PUCCH with the fifth PUCCH based on the determination that the fourth PUCCH overlaps in time with at least a part of a fifth PUCCH.

At 826, the UE 802 may transmit, to the base station 804, at least one of the plurality of channels of the plurality of channels including one or more PUCCHs and one or more PUSCHs. The base station 804 may receive, from the UE 802, at least one of the plurality of channels of the plurality of channels including one or more PUCCHs and one or more PUSCHs. Here, the at least one of the plurality of channels of the plurality of channels may be determined from resolving the channel collision between the first set of channels and the second set of channels having different channel priorities.

Figure 9:
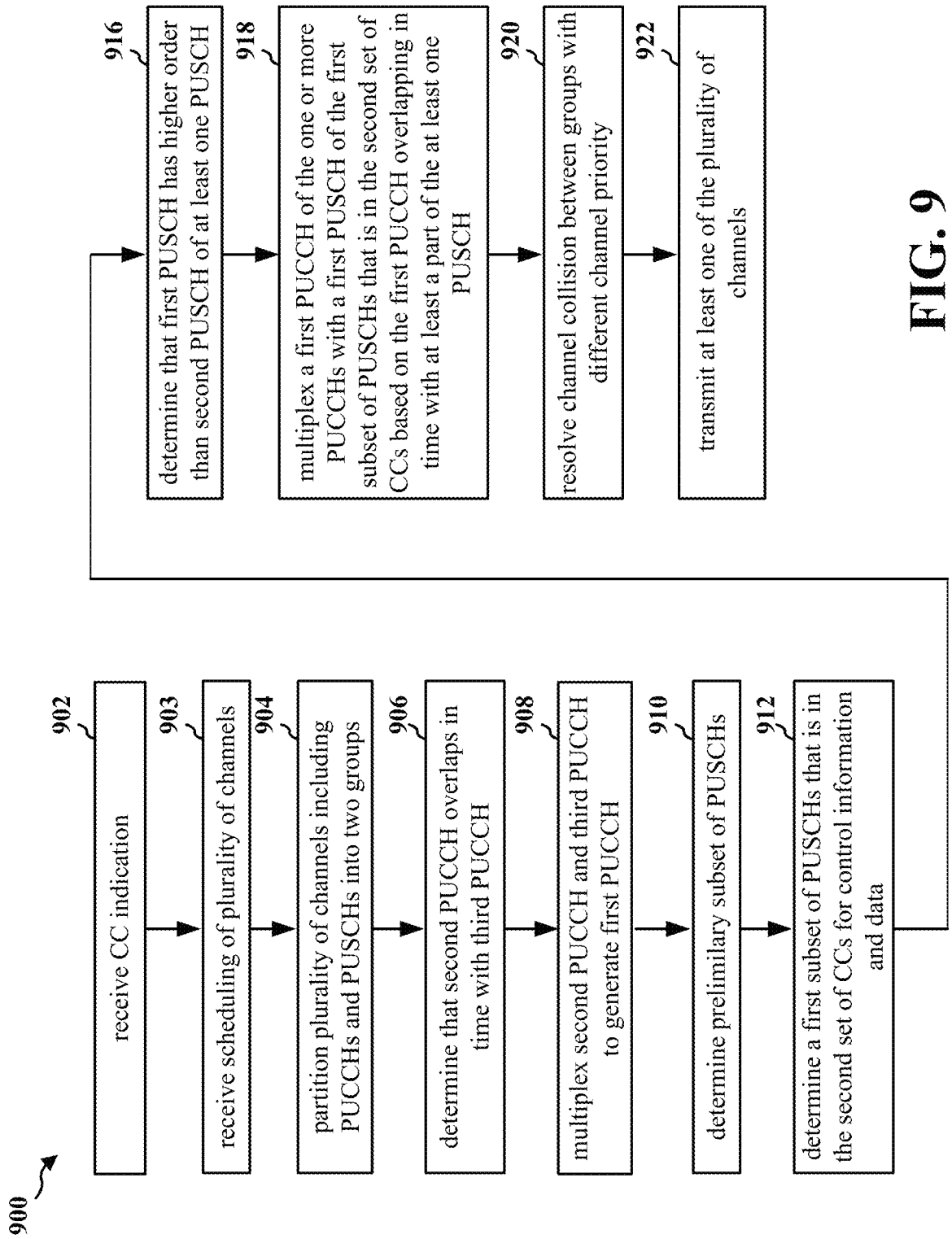
FIG. 9 is a flowchart of a method of wireless communication.

FIG. 9 is a flowchart 900 of a method of wireless communication. The method may be performed by a UE (e.g., the UE 104; the apparatus 1202). The UE may partition a plurality of channels including PUCCHs and PUSCHs into two groups, the plurality of channels being scheduled for transmission on a first set of CCs for communicating data and a second set of CCs for communicating control information and data, determine a first subset of PUSCHs of the one or more PUSCHs that is in the second set of CCs, determine that a first PUCCH of the one or more PUCCHs overlaps in time with at least a part of at least one PUSCH of the first subset of PUSCHs, and multiplex the first PUCCH with a first PUSCH of the first subset of PUSCH based on the determination that the first PUCCH overlaps in time with at least a part of the at least one PUSCH.

At 902, the UE may receive, from the base station 804, an indication of CCs including a first set of CCs for communicating data and a second set of CCs for communicating control information and data. Here, a signal indicating the CCs may indicate which CC supports the parallel uplink transmission. That is, the signal may indicate a first set of CCs for communicating data and a second set of CCs for communicating control information and data. For example, at 806, the UE 802 may receive, from the base station 804, an indication of CCs including a first set of CCs for communicating data and a second set of CCs for communicating control information and data. Furthermore, 902 may be performed by a parallel uplink transmission component 1240.

At 903, the UE may receive, from the base station, an instruction scheduling a plurality of channels for transmission on the CCs including the first set of CCs for communicating data and the second set of CCs for communicating control information and data. That is, the plurality of channels may include one or more PUCCHs and one or more PUSCHs. In one aspect, the one or more PUCCHs may be schedule to be transmitted on the first set of CCs or the second set of CCs, and the one or more PUSCHs may be scheduled to be transmitted on the second set of CCs. For example, at 807, the UE 802 may receive, from the base station 804, an instruction scheduling a plurality of channels for transmission on the CCs including the first set of CCs for communicating data and the second set of CCs for communicating control information and data. Furthermore, 903 may be performed by a parallel uplink transmission component 1240.

At 904, the UE may partition the plurality of channels including the one or more PUCCHs and the one or more PUSCHs into two groups, the plurality of channels being scheduled for transmission on CCs including the first set of CCs for communicating data and the second set of CCs for communicating control information and data. In one aspect, the two groups may include a first group including the one or more PUCCHs and a second group including the one or more PUSCHs. In another aspect, the two groups may include a first set of channels and the second set of channels, the first set of channels and the second set of channels having different channel priorities. For example, at 808, the UE 802 may partition the plurality of channels including the one or more PUCCHs and the one or more PUSCHs into two groups, the plurality of channels being scheduled for transmission on CCs including the first set of CCs for communicating data and the second set of CCs for communicating control information and data. Furthermore, 904 may be performed by the parallel uplink transmission component 1240.

At 906, based on partitioning the plurality of channels being into two groups including the first group including the one or more PUCCHs and the second group including the one or more PUSCHs at 904, the UE may determine that a second PUCCH of the first group overlaps in time with at least a part of a third PUCCH of the first group. For example, at 810, the UE 802 may determine that a second PUCCH of the first group overlaps in time with at least a part of a third PUCCH of the first group. Furthermore, 906 may be performed by the parallel uplink transmission component 1240.

At 908, the UE may multiplex the second PUCCH with the overlapping third PUCCH to generate the first PUCCH. Here, the UE may multiplex the second PUCCH with the overlapping third PUCCH to generate the first PUCCH based on determining that the second PUCCH of the first group overlaps in time with at least a part of the third PUCCH of the first group at 906, For example, at 812, the UE 802 may multiplex the second PUCCH with the overlapping third PUCCH to generate the first PUCCH. Furthermore, 908 may be performed by the parallel uplink transmission component 1240.

At 910, the UE may determine a preliminary subset of PUSCHs of the at least one PUSCH that has a channel priority same as the first PUCCH. That is, the UE may, for each PUCCH, generate a preliminary subset of PUSCHs that has the same channel priority as the corresponding PUCCH. From the preliminary subset of PUSCHs, the UE may generate a subset of PUSCHs that are on the CCs for control information and data transmission and data by excluding the PUSCHs that are on the CCs for data transmission. For example, at 814, the UE 802 may determine a preliminary subset of PUSCHs of at least one PUSCH that has a channel priority same as the first PUCCH. Furthermore, 910 may be performed by the parallel uplink transmission component 1240.

At 912, the UE may determine a first subset of PUSCHs of the one or more PUSCHs that is in the second set of CCs. The first subset of PUSCHs may be determined based on the indication received from the base station at 806 for each CCs indicating whether the CC is for communicating data or communicating control information and data. In one aspect, the first subset of PUSCHs may be determined from the preliminary subset of PUSCHs that is in the second set of CCs, as determined at 910. For example, at 816, the UE 802 may determine a first subset of PUSCHs of the one or more PUSCHs that is in the second set of CCs. Furthermore, 912 may be performed by the parallel uplink transmission component 1240.

component 1240 At 916, a first PUCCH of the one or more PUCCHs may overlap in time with at least a part of at least one PUSCH of the first subset of PUSCHs and the at least one PUSCH includes the first PUSCH with a first order and a second PUSCH with a second order, and the UE may determine that the first order of the first PUSCH of at least one PUSCH is greater than the second order of the second PUSCH of the at least one PUSCH, and determine a first PUSCH for multiplexing with the first PUCCH from the first subset of PUSCHs based on the determination that the first order of the first PUSCH is greater. In one aspect, the first order of the first PUSCH with scheduled aperiodic CSI may be determined to be greater than the second order of the second PUSCH without scheduled aperiodic CSI. In another aspect, the first order of the first PUSCH on a first CC may be higher than the second order of the second PUSCH on a second CC based on a first CC index of the first CC being smaller than a second CC index of the second CC. For example, at 820, the UE 802 may determine that the first order of the first PUSCH of at least one PUSCH is greater than the second order of the second PUSCH of the at least one PUSCH, and determine a first PUSCH for multiplexing with the first PUCCH from the first subset of PUSCHs based on the determination that the first order of the first PUSCH is greater. Furthermore, 916 may be performed by the parallel uplink transmission component 1240.

At 918, the UE may multiplex the first PUCCH with the first PUSCH of the first subset of PUSCH based on the determination that the first PUCCH overlaps in time with at least a part of at least one PUSCH. For example, at 822, the UE 802 may multiplex the first PUCCH with the first PUSCH of the first subset of PUSCH based on the determination that the first PUCCH overlaps in time with at least a part of the at least one PUSCH. Furthermore, 918 may be performed by the parallel uplink transmission component 1240.

At 920, the UE may resolve channel collision between the first set of channels and the second set of channels having different channel priorities. In one aspect, when channels with different priority collide, the UE may transmit the channel with the high channel priority and drop the channel with the low channel priority, except if both the high priority channel and the low priority channel are PUSCH on different CCs, where the UE may transmit them simultaneously. In another aspect, when a PUCCH overlaps with PUSCHs with a different priority than the PUCCH, the UE may follow the procedures at 916 and/or 918. In another aspect, when a PUCCH overlap with PUCCHs, with a different priority than the PUCCH, the UE may multiplex these PUCCHs. In another aspect, if a PUCCH overlaps with PUSCHs with a different priority than the PUCCH, the UE may follow the procedures at 820 and/or 822. That is, the UE may determine that the first PUSCH multiplexed with the first PUCCH overlaps in time with at least a part of a fourth PUCCH in the second set of channels, and multiplex the fourth PUCCH with the first PUSCH multiplexed with the first PUCCH based on the determination that the first PUSCH multiplexed with the first PUCCH overlaps in time with at least a part of a fourth PUCCH. In another aspect, the UE may determine a second subset of PUSCHs of the second set of channels that is in the second set of CCs, determine that a fifth PUCCH in the first set of channels that is not overlapping with any PUSCH of the first subset of PUSCHs overlaps in time with at least a part of a third PUSCH of the second set of PUSCHs, and multiplex the fifth PUCCH of the first subset of PUSCHs with the third PUSCH of the second set of PUSCHs based on the determination that the fifth PUCCH overlaps in time with at least a part of the third PUSCH. In another aspect, when a PUCCH overlaps with PUCCHs, with a different priority than the PUCCH, the UE may multiplex these PUCCHs. That is, the UE may determine that a fourth PUCCH in the second set of channels overlaps in time with at least a part of a fifth PUCCH in the first set of channels, and multiplex the fourth PUCCH with the fifth PUCCH based on the determination that the fourth PUCCH overlaps in time with at least a part of a fifth PUCCH. For example, at 824, the UE 802 may resolve channel collision between the first set of channels and the second set of channels having different channel priorities.

Furthermore, 920 may be performed by the parallel uplink transmission component 1240.

At 922, the UE may transmit, to the base station, at least one of the plurality of channels of the plurality of channels including one or more PUCCHs and one or more PUSCHs. Here, the at least one of the plurality of channels of the plurality of channels may be determined from resolving the channel collision between the first set of channels and the second set of channels having different channel priorities. For example, at 826, the UE 802 may transmit, to the base station 804, at least one of the plurality of channels of the plurality of channels including one or more PUCCHs and one or more PUSCHs. Furthermore, 922 may be performed by the parallel uplink transmission component 1240.

Figure 10:
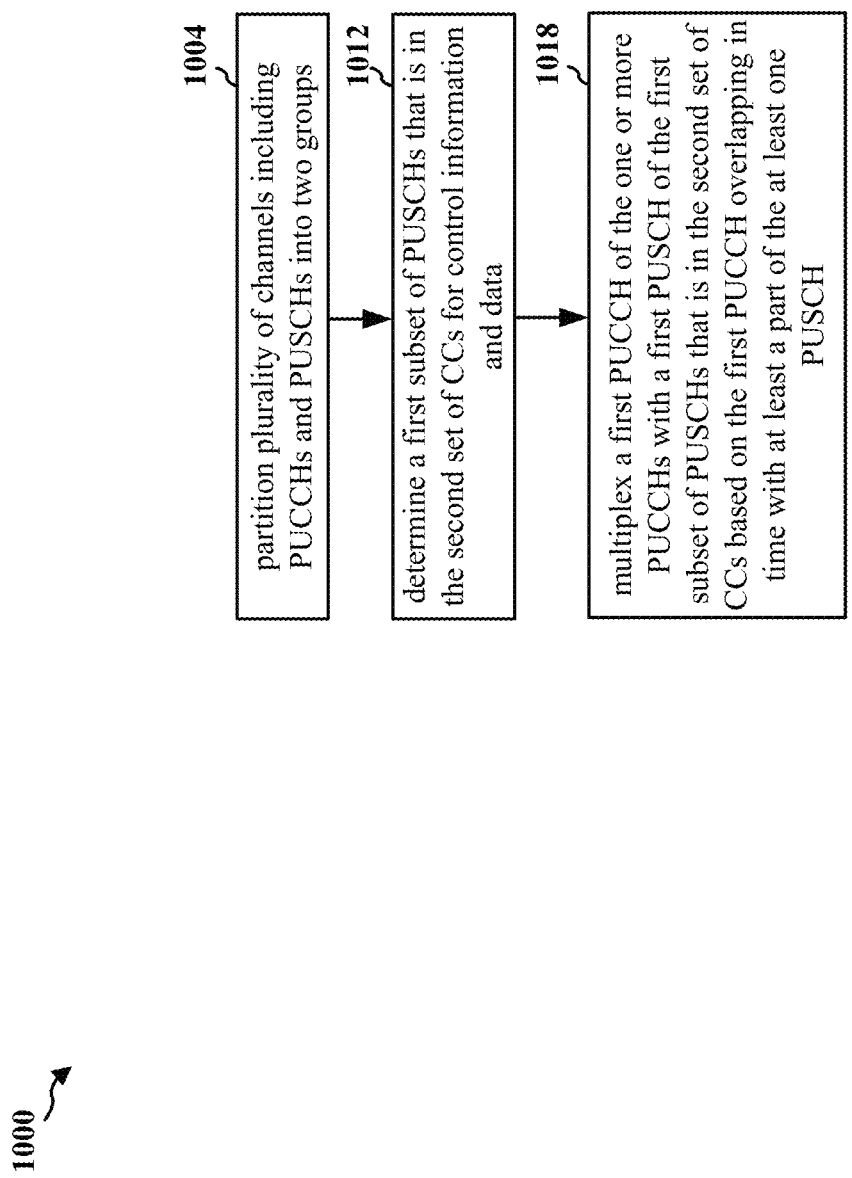
FIG. 10 is a flowchart of a method of wireless communication.

FIG. 10 is a flowchart 1000 of a method of wireless communication. The method may be performed by a UE (e.g., the UE 104; the apparatus 1202). The UE may partition a plurality of channels including PUCCHs and PUSCHs into two groups, the plurality of channels being scheduled for transmission on a first set of CCs for communicating data and a second set of CCs for communicating control information and data, determine a first subset of PUSCHs of the one or more PUSCHs that is in the second set of CCs, determine that a first PUCCH of the one or more PUCCHs overlaps in time with at least a part of at least one PUSCH of the first subset of PUSCHs, and multiplex the first PUCCH with a first PUSCH of the first subset of PUSCH based on the determination that the first PUCCH overlaps in time with at least a part of the at least one PUSCH.

At 1004, the UE may partition the plurality of channels including the one or more PUCCHs and the one or more PUSCHs into two groups, the plurality of channels being scheduled for transmission on CCs including the first set of CCs for communicating data and the second set of CCs for communicating control information and data. In one aspect, the two groups may include a first group including the one or more PUCCHs and a second group including the one or more PUSCHs. In another aspect, the two groups may include a first set of channels and the second set of channels, the first set of channels and the second set of channels having different channel priorities. For example, at 808, the UE 802 may partition the plurality of channels including the one or more PUCCHs and the one or more PUSCHs into two groups, the plurality of channels being scheduled for transmission on CCs including the first set of CCs for communicating data and the second set of CCs for communicating control information and data. Furthermore, 1004 may be performed by the parallel uplink transmission component 1240.

At 1012, the UE may determine a first subset of PUSCHs of the one or more PUSCHs that is in the second set of CCs. The first subset of PUSCHs may be determined based on the indication received from the base station at 806 for each CCs indicating whether the CC is for communicating data or communicating control information and data. In one aspect, the first subset of PUSCHs may be determined from the preliminary subset of PUSCHs that is in the second set of CCs, as determined at 1010. For example, at 816, the UE 802 may determine a first subset of PUSCHs of the one or more PUSCHs that is in the second set of CCs. Furthermore, 1012 may be performed by the parallel uplink transmission component 1240.

At 1018, the UE may multiplex the first PUCCH with the first PUSCH of the first subset of PUSCH based on the determination that the first PUCCH overlaps in time with at least a part of at least one PUSCH. For example, at 822, the UE 802 may multiplex the first PUCCH with the first PUSCH of the first subset of PUSCH based on the determination that the first PUCCH overlaps in time with at least a part of the at least one PUSCH. Furthermore, 1018 may be performed by the parallel uplink transmission component 1240.

Figure 11:
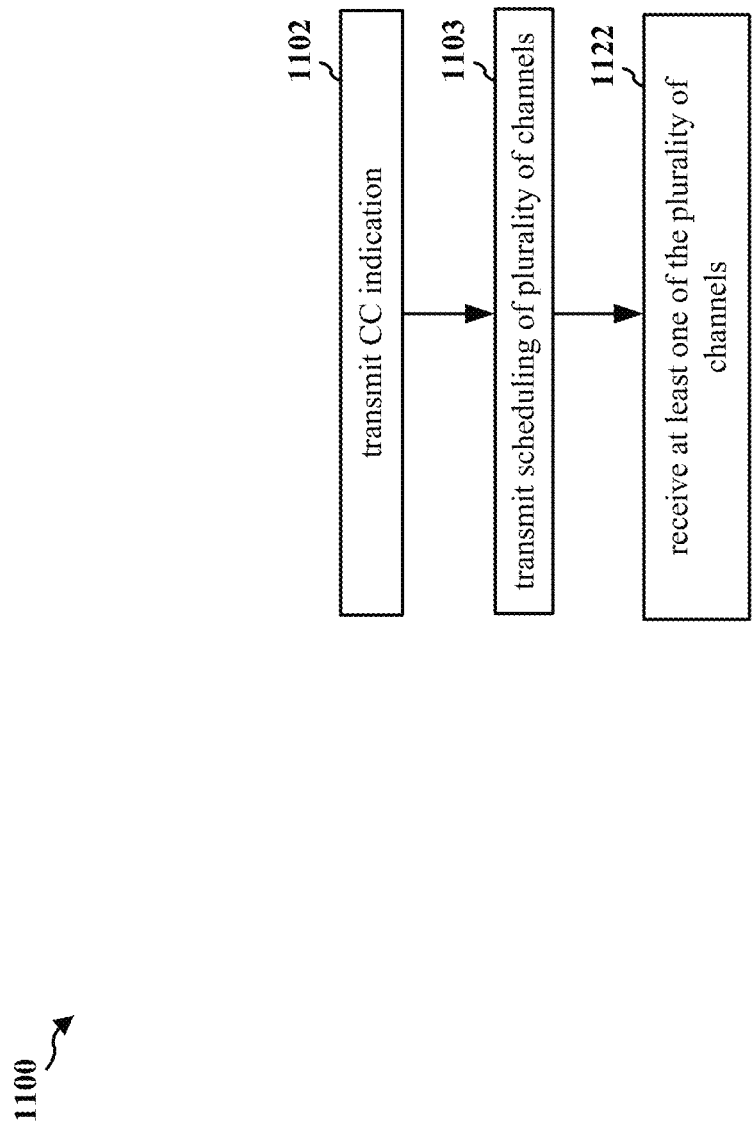
FIG. 11 is a flowchart of a method of wireless communication.

FIG. 11 is a flowchart 1100 of a method of wireless communication. The method may be performed by a base station (e.g., the base station 102/180; the apparatus 1302). The base station may transmit, to a UE, an indication of component carriers (CCs) including a first set of CCs for communicating data and a second set of CCs for communicating control information and data and an instruction scheduling a plurality of channels on the CCs including the first set of CCs for communicating data and a second set of CCs for communicating control information and data, and receive, from the UE, at least one of the plurality of channels.

At 1102, the base station may transmit, to the UE, an indication of CCs including a first set of CCs for communicating data and a second set of CCs for communicating control information and data. Here, a signal indicating the CCs may indicate which CC supports the parallel uplink transmission. That is, the signal may indicate a first set of CCs for communicating data and a second set of CCs for communicating control information and data. For example, at 806, the base station 804 may transmit, to the UE 802, an indication of CCs including a first set of CCs for communicating data and a second set of CCs for communicating control information and data. Furthermore, 1106 may be performed by a parallel uplink reception component 1340.

At 1103, the base station may transmit, to the UE, an instruction scheduling a plurality of channels for transmission on the CCs including the first set of CCs for communicating data and the second set of CCs for communicating control information and data. That is, the plurality of channels may include one or more PUCCHs and one or more PUSCHs. In one aspect, the one or more PUCCHs may be schedule to be transmitted on the first set of CCs or the second set of CCs, and the one or more PUSCHs may be scheduled to be transmitted on the second set of CCs. For example, at 807, the base station 804 may transmit, to the UE 802, an instruction scheduling a plurality of channels for transmission on the CCs including the first set of CCs for communicating data and the second set of CCs for communicating control information and data. Furthermore, 1108 may be performed by the parallel uplink reception component 1340.

At 1122, the base station may receive, from the UE, at least one of the plurality of channels of the plurality of channels including one or more PUCCHs and one or more PUSCHs. Here, the at least one of the plurality of channels of the plurality of channels may be determined from resolving the channel collision between the first set of channels and the second set of channels having different channel priorities. For example, at 826, the base station 804 may receive, from the UE 802, at least one of the plurality of channels of the plurality of channels including one or more PUCCHs and one or more PUSCHs. Furthermore, 1110 may be performed by the parallel uplink reception component 1340.

Figure 12:
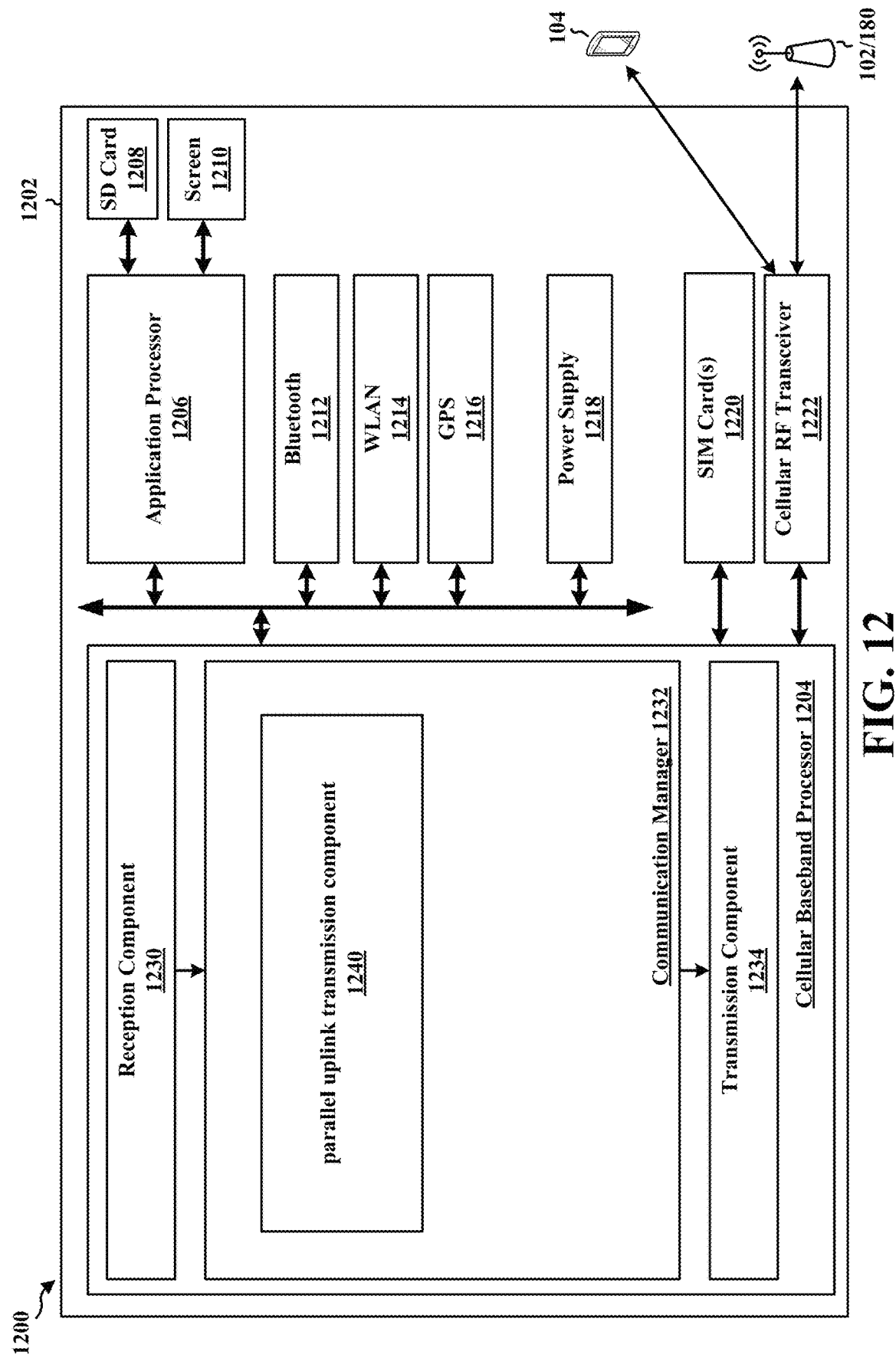
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a parallel uplink transmission component 1240 that is configured to receive an indication of CCs and an instruction scheduling a plurality of channels for transmission on the CCs, partition a plurality of channels including PUCCHs and PUSCHs into two groups, determine that a second PUCCH of the first group overlaps in time with at least a part of a third PUCCH of the first group and multiplex the second PUCCH with the overlapping third PUCCH to generate the first PUCCH, determine a preliminary subset of PUSCHs of the at least one PUSCH that has a channel priority same as the first PUCCH, determine a first subset of PUSCHs of the one or more PUSCHs that is in the second set of CCs, determine that a first PUCCH of the one or more PUCCHs overlaps in time with at least a part of at least one PUSCH of the first subset of PUSCHs, configured to determine, that the first rank of the first PUSCH of the at least one PUSCH is greater than the second rank of the second PUSCH of the at least one PUSCH, and determine a first PUSCH for multiplexing with the first PUCCH from the first subset of PUSCHs based on the determination that the first rank of the first PUSCH is greater, multiplex the first PUCCH with the first PUSCH of the first subset of PUSCH based on the determination that the first PUCCH overlaps in time with at least a part of the at least one PUSCH, and resolve channel collision between the first set of channels and the second set of channels having different channel priorities, e.g., as described in connection with 902, 903, 904, 906, 908, 910, 912, 914, 916, 918, 920, 922, 1004, 1012, and 1018.

The apparatus may include additional components that perform each of the blocks of the algorithm in the flowcharts of FIGS. 8, 9, and 10. As such, each block in the flowcharts of FIGS. 8, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes The apparatus 1302 includes means for partitioning a plurality of channels including one or more PUCCHs and one or more PUSCHs into two groups, the plurality of channels being scheduled for transmission on CCs including a first set of CCs for communicating data and a second set of CCs for communicating control information and data, identify a first subset of PUSCHs of the one or more PUSCHs that is in the second set of CCs, and means for multiplexing a first PUCCH of the one or more PUCCHs with a first PUSCH of the first subset of PUSCHs that is in the second set of CCs based on the first PUCCH overlapping in time with at least a part of the at least one PUSCH. The apparatus 1302 includes means for determining that a second PUCCH of the first group overlaps in time with at least a part of a third PUCCH of the first group, and means for multiplexing the second PUCCH with the overlapping third PUCCH to generate the first PUCCH. The apparatus 1302 includes means for determining that the first order of the first PUSCH of the at least one PUSCH is greater than the second order of the second PUSCH of the at least one PUSCH, and means for determining the first PUSCH for multiplexing with the first PUCCH from the first subset of PUSCHs based on the determination that the first order of the first PUSCH is greater. The apparatus 1302 includes means for determining a preliminary subset of PUSCHs of the at least one PUSCH that has a channel priority same as the first PUCCH. The apparatus 1302 includes means for determining that the first order of the first PUSCH of the at least one PUSCH is greater than the second order of the second PUSCH of the at least one PUSCH, and means for determining the first PUSCH for multiplexing with the first PUCCH from the first subset of PUSCHs based on the determination that the first order of the first PUSCH is greater. The apparatus 1302 includes means for determining that the first order of the first PUSCH of the at least one PUSCH is greater than the second order of the second PUSCH of the at least one PUSCH, and means for determining the first PUSCH for multiplexing with the first PUCCH from the first subset of PUSCHs based on the determination that the first order of the first PUSCH is greater. The apparatus 1302 includes means for resolving channel collision between the first set of channels and the second set of channels having different channel priorities. The apparatus 1302 includes means for determining that the first PUSCH multiplexed with the first PUCCH overlaps in time with at least a part of a third PUSCH of the second set of PUSCHs, the third PUSCH and the first PUSCH multiplexed with the first PUCCH being scheduled for transmission on a same CC, and means for determining to drop one of the first PUSCH multiplexed with the first PUCCH or the third PUSCH that has a lower channel priority. The apparatus 1302 includes means for determining that the first PUSCH multiplexed with the first PUCCH overlaps in time with at least a part of a fourth PUCCH in the second set of channels, and means for determining to drop one of the first PUSCH multiplexed with the first PUCCH or the fourth PUCCH that has a lower channel priority. The apparatus 1302 includes means for determining that the first PUSCH multiplexed with the first PUCCH overlaps in time with at least a part of a fourth PUCCH in the second set of channels, and means for multiplexing the fourth PUCCH with the first PUSCH multiplexed with the first PUCCH based on the determination that the first PUSCH multiplexed with the first PUCCH overlaps in time with at least a part of a fourth PUCCH. The apparatus 1302 includes means for determining a second subset of PUSCHs of the second set of channels that is in the second set of CCs, means for determining that a fifth PUCCH in the first set of channels that is not overlapping with any PUSCH of the first subset of PUSCHs overlaps in time with at least a part of a third PUSCH of the second set of PUSCHs, and means for determining multiplexing the fifth PUCCH of the first subset of PUSCHs with the third PUSCH of the second set of PUSCHs based on the determination that the fifth PUCCH overlaps in time with at least a part of the third PUSCH. The apparatus 1302 includes means for determining that a fourth PUCCH in the second set of channels overlaps in time with at least a part of a fifth PUCCH in the first set of channels, and means for multiplexing the fourth PUCCH with the fifth PUCCH based on the determination that the fourth PUCCH overlaps in time with at least a part of a fifth PUCCH. The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 13:
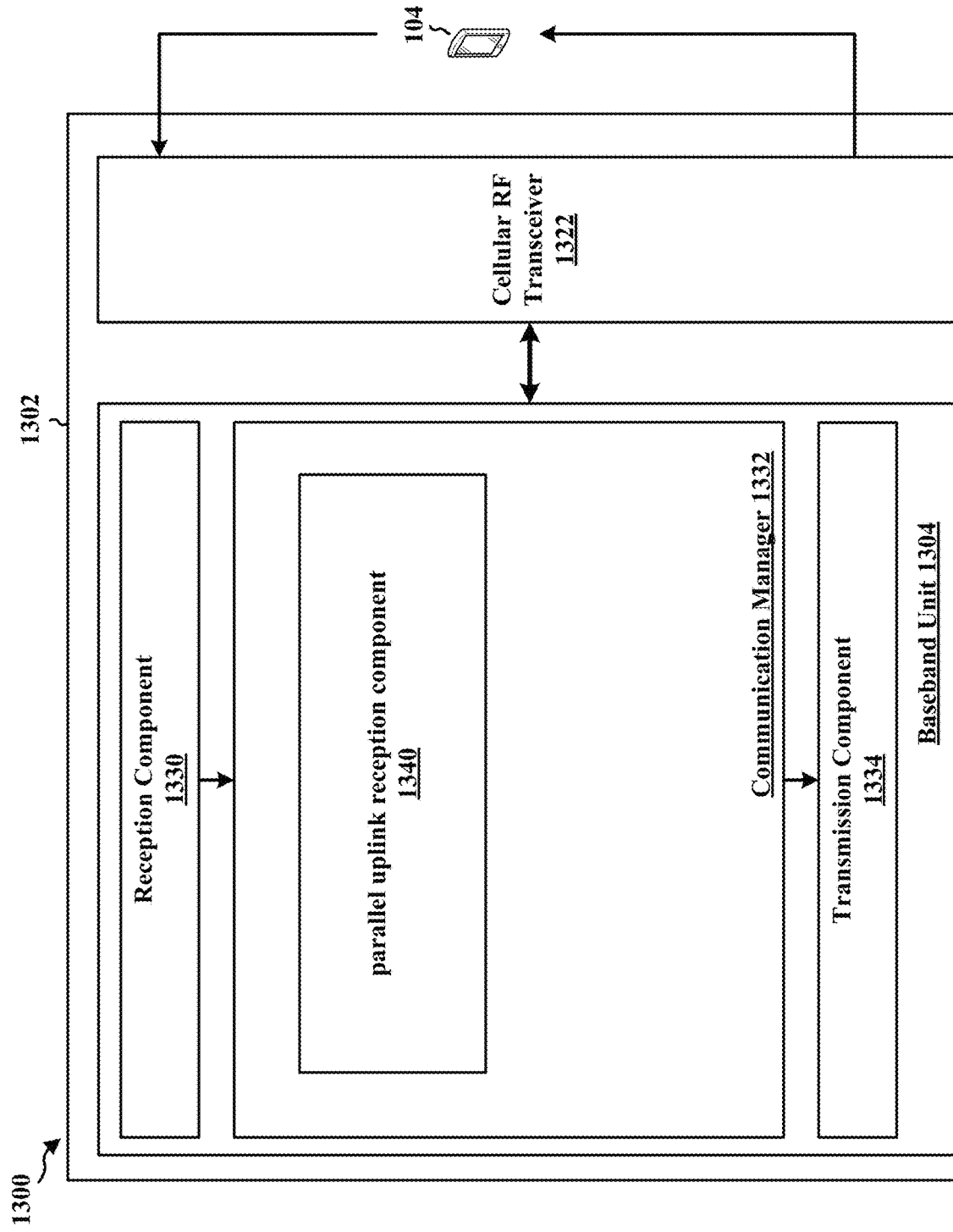
FIG. 13 is a diagram illustrating an example of a hardware implementation for an example apparatus.

FIG. 13 is a diagram 1300 illustrating an example of a hardware implementation for an apparatus 1302. The apparatus 1302 may be a base station, a component of a base station, or may implement base station functionality. In some aspects, the apparatus 1202 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes a parallel uplink reception component 1340 that is configured to transmit an indication of CCs and an instruction scheduling a plurality of channels for transmission on the CCs, and receive, from the UE, at least one of the plurality of channels of the plurality of channels including one or more PUCCHs and one or more PUSCHs. e.g., as described in connection with 1102, 1103, and 1122.

The apparatus may include additional components that perform each of the blocks of the algorithm in the flowcharts of FIGS. 8 and 11. As such, each block in the flowcharts of FIGS. 8 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for transmitting, to a UE, an indication of CCs including a first set of CCs for communicating data and a second set of CCs for communicating control information and data, means for transmitting, to the UE, an instruction scheduling a plurality of channels on the CCs including the first set of CCs for communicating data and a second set of CCs for communicating control information and data, and means for receiving, from the UE, at least one of the plurality of channels. The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

A UE may partition a plurality of channels including one or more PUCCHs and one or more PUSCHs into two groups, the plurality of channels being scheduled for transmission on CCs including a first set of CCs for communicating data and a second set of CCs for communicating control information and data, determine a first subset of PUSCHs of the one or more PUSCHs that is in the second set of CCs, determine that a first PUCCH of the one or more PUCCHs overlaps in time with at least a part of at least one PUSCH of the first subset of PUSCHs, and multiplex the first PUCCH with a first PUSCH of the first subset of PUSCH based on the determination that the first PUCCH overlaps in time with at least a part of the at least one PUSCH. The first subset of PUSCHs may be determined based on an indication received from a base station for each CCs indicating whether the CC is for communicating data or communicating control information and data.

In some aspects, the two groups may include a first group including the one or more PUCCHs and a second group including the one or more PUSCHs. The partitioning the plurality of channels may include determining that a second PUCCH of the first group overlaps in time with at least a part of a third PUCCH of the first group, and multiplexing the second PUCCH with the overlapping third PUCCH to generate the first PUCCH. The at least one PUSCH may include the first PUSCH with a first rank and a second PUSCH with a second rank, and the UE may further determine that the first rank of the first PUSCH of the at least one PUSCH is greater than the second rank of the second PUSCH of the at least one PUSCH, and determine the first PUSCH for multiplexing with the first PUCCH from the first subset of PUSCHs based on the determination that the first rank of the first PUSCH is greater.

The UE may determine the first subset of PUSCHs by determining a preliminary subset of PUSCHs of the at least one PUSCH that has a channel priority same as the first PUCCH, and the first subset of PUSCHs may be determined from the preliminary subset of PUSCHs that is in the second set of CCs.

In some aspects, the two groups may include a first set of channels and a second set of channels, the first set of channels and the second set of channels having different channel priorities.

The at least one PUSCH may include the first PUSCH with a first rank and a second PUSCH with a second rank, and the UE may further determine that the first rank of the first PUSCH of the at least one PUSCH is greater than the second rank of the second PUSCH of the at least one PUSCH, and determining the first PUSCH for multiplexing with the first PUCCH from the first subset of PUSCHs based on the determination that the first rank of the first PUSCH is greater.

The UE may resolve channel collision between the first set of channels and the second set of channels having different channel priorities. In one aspect, the UE may determine that the first PUSCH multiplexed with the first PUCCH overlaps in time with at least a part of a third PUSCH of the second set of PUSCHs, the third PUSCH and the first PUSCH multiplexed with the first PUCCH being scheduled for transmission on a same CC, and determine to drop one of the first PUSCH multiplexed with the first PUCCH or the third PUSCH that has a lower channel priority. In another aspect, the UE may determine that the first PUSCH multiplexed with the first PUCCH overlaps in time with at least a part of a fourth PUCCH in the second set of channels, and determining to drop one of the first PUSCH multiplexed with the first PUCCH and the fourth PUCCH that has a lower channel priority. In another aspect, the UE may determine that the first PUSCH multiplexed with the first PUCCH overlaps in time with at least a part of a fourth PUCCH in the second set of channels, and multiplex the fourth PUCCH with the first PUSCH multiplexed with the first PUCCH based on the determination that the first PUSCH multiplexed with the first PUCCH overlaps in time with at least a part of a fourth PUCCH. In another aspect, the UE may determine a second subset of PUSCHs of the second set of channels that is in the second set of CCs, determine that a fifth PUCCH in the first set of channels that is not overlapping with any PUSCH of the first subset of PUSCHs overlaps in time with at least a part of a third PUSCH of the second set of PUSCHs, and multiplex the fifth PUCCH of the first subset of PUSCHs with the third PUSCH of the second set of PUSCHs based on the determination that the fifth PUCCH overlaps in time with at least a part of the third PUSCH. In another aspect, the UE may determine that a fourth PUCCH in the second set of channels overlaps in time with at least a part of a fifth PUCCH in the first set of channels, and multiplex the fourth PUCCH with the fifth PUCCH based on the determination that the fourth PUCCH overlaps in time with at least a part of a fifth PUCCH.

The at least one PUSCH may include the first PUSCH with a first rank and a second PUSCH with a second rank, and the UE may further determine that the first rank of the first PUSCH of the at least one PUSCH is greater than the second rank of the second PUSCH of the at least one PUSCH, and determine the first PUSCH for multiplexing with the first PUCCH from the first subset of PUSCHs based on the determination that the first rank of the first PUSCH is greater.

In one aspect, a rank of a PUSCH with scheduled aperiodic channel state information (CSI) may be determined to be greater than a rank of a PUSCH without scheduled aperiodic CSI. In another aspect, a rank of a PUSCH on a first CC may be determined to be higher than a rank of a PUSCH on a second CC based on a first CC index of the first CC being smaller than a second CC index of the second CC.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of a UE, the method including partitioning a plurality of channels including one or more PUCCHs and one or more PUSCHs into two groups, the plurality of channels being scheduled for transmission on CCs including a first set of CCs for communicating data and a second set of CCs for communicating control information and data, identifying a first subset of PUSCHs of the one or more PUSCHs that is in the second set of CCs, and multiplexing a first PUCCH of the one or more PUCCHs with a first PUSCH of the first subset of PUSCHs that is in the second set of CCs based on the first PUCCH overlapping in time with at least a part of the at least one PUSCH.

Aspect 2 is the method of aspect 1, where the first subset of PUSCHs is identified based on an indication received from a base station for each CCs indicating whether the CC is for communicating data or communicating control information and data.

Aspect 3 is the method of any of aspects 1 and 2, where the two groups include a first group including the one or more PUCCHs and a second group including the one or more PUSCHs.

Aspect 4 is the method of aspect 3, where partitioning the plurality of channels includes determining that a second PUCCH of the first group overlaps in time with at least a part of a third PUCCH of the first group, and multiplexing the second PUCCH with the overlapping third PUCCH to generate the first PUCCH.

Aspect 5 is the method of any of aspects 3 and 4, where the at least one PUSCH includes the first PUSCH with a first order and a second PUSCH with a second order, and the method further including determining that the first order of the first PUSCH of the at least one PUSCH is greater than the second order of the second PUSCH of the at least one PUSCH, and determining the first PUSCH for multiplexing with the first PUCCH from the first subset of PUSCHs based on the determination that the first order of the first PUSCH is greater.

Aspect 6 is the method of aspect 5, where the first order of the first PUSCH with scheduled aperiodic CSI is determined to be greater than the second order of the second PUSCH without scheduled aperiodic CSI.

Aspect 7 is the method of any of aspects 5 and 6, where the first order of the first PUSCH on a first CC is higher than the second order of the second PUSCH on a second CC based on a first CC index of the first CC being smaller than a second CC index of the second CC.

Aspect 8 is the method of any of aspects 3 to 7, where the determining the first subset of PUSCHs includes determining a preliminary subset of PUSCHs of the at least one PUSCH that has a channel priority same as the first PUCCH, and where the first subset of PUSCHs are determined from the preliminary subset of PUSCHs that is in the second set of CCs.

Aspect 9 is the method of aspect 8, where the at least one PUSCH includes the first PUSCH with a first order and a second PUSCH with a second order, and the method further including determining that the first order of the first PUSCH of the at least one PUSCH is greater than the second order of the second PUSCH of the at least one PUSCH, and determining the first PUSCH for multiplexing with the first PUCCH from the first subset of PUSCHs based on the determination that the first order of the first PUSCH is greater.

Aspect 10 is the method of aspect 9, where the first order of the first PUSCH with scheduled aperiodic CSI is determined to be greater than the second order of the second PUSCH without scheduled aperiodic CSI.

Aspect 11 is the method of any of aspects 9 and 10, where the first order of the first PUSCH on a first CC is higher than the second order of the second PUSCH on a second CC based on a first CC index of the first CC being smaller than a second CC index of the second CC.

Aspect 12 is the method of aspect 1, where the two groups include a first set of channels and a second set of channels, the first set of channels and the second set of channels having different channel priorities.

Aspect 13 is the method of aspect 12, where the at least one PUSCH includes the first PUSCH with a first order and a second PUSCH with a second order, and where the method further including determining that the first order of the first PUSCH of the at least one PUSCH is greater than the second order of the second PUSCH of the at least one PUSCH, and determining the first PUSCH for multiplexing with the first PUCCH from the first subset of PUSCHs based on the determination that the first order of the first PUSCH is greater.

Aspect 14 is the method of aspect 13, where the order of the first PUSCH with scheduled aperiodic CSI is determined to be higher than the second PUSCH without scheduled aperiodic CSI.

Aspect 15 is the method of any of aspects 13 and 14, where the first order of the first PUSCH on a first CC is higher than the second order of the second PUSCH on a second CC based on a first CC index of the first CC being smaller than a second CC index of the second CC.

Aspect 16 is the method of any of aspects 12 to 15, further including resolving channel collision between the first set of channels and the second set of channels having different channel priorities.

Aspect 17 is the method of aspect 16, where resolving channel collision between the first set of channels and the second set of channels having different channel priorities includes determining that the first PUSCH multiplexed with the first PUCCH overlaps in time with at least a part of a third PUSCH of the second set of PUSCHs, the third PUSCH and the first PUSCH multiplexed with the first PUCCH being scheduled for transmission on a same CC, and determining to drop one of the first PUSCH multiplexed with the first PUCCH or the third PUSCH that has a lower channel priority.

Aspect 18 is the method of aspect 16, where resolving channel collision between the first set of channels and the second set of channels having different channel priorities includes determining that the first PUSCH multiplexed with the first PUCCH overlaps in time with at least a part of a fourth PUCCH in the second set of channels, and determining to drop one of the first PUSCH multiplexed with the first PUCCH and the fourth PUCCH that has a lower channel priority.

Aspect 19 is the method of aspect 16, where resolving channel collision between the first set of channels and the second set of channels having different channel priorities includes determining that the first PUSCH multiplexed with the first PUCCH overlaps in time with at least a part of a fourth PUCCH in the second set of channels, and multiplexing the fourth PUCCH with the first PUSCH multiplexed with the first PUCCH based on the determination that the first PUSCH multiplexed with the first PUCCH overlaps in time with at least a part of a fourth PUCCH.

Aspect 20 is the method of aspect 16, where resolving channel collision between the first set of channels and the second set of channels having different channel priorities includes determining a second subset of PUSCHs of the second set of channels that is in the second set of CCs, determining that a fifth PUCCH in the first set of channels that is not overlapping with any PUSCH of the first subset of PUSCHs overlaps in time with at least a part of a third PUSCH of the second set of PUSCHs, and multiplexing the fifth PUCCH of the first subset of PUSCHs with the third PUSCH of the second set of PUSCHs based on the determination that the fifth PUCCH overlaps in time with at least a part of the third PUSCH.

Aspect 21 is the method of aspect 16, where resolving channel collision between the first set of channels and the second set of channels having different channel priorities includes determining that a fourth PUCCH in the second set of channels overlaps in time with at least a part of a fifth PUCCH in the first set of channels, and multiplexing the fourth PUCCH with the fifth PUCCH based on the determination that the fourth PUCCH overlaps in time with at least a part of a fifth PUCCH.

Aspect 22 is an apparatus for wireless communication including at least one processor coupled to a memory and configured to implement a method as in any of aspects 1 to 21.

Aspect 23 is an apparatus for wireless communication including means for implementing a method as in any of aspects 1 to 21.

Aspect 24 is a computer-readable medium storing computer executable code, where the code when executed by a processor causes the processor to implement a method as in any of aspects 1 to 21.

What is claimed is:

1. A apparatus for wireless communication at a user equipment (UE), comprising:
   memory; and
   at least one processor coupled to the memory and configured to:
      partition a plurality of channels comprising one or more physical uplink control channels (PUCCHs) and one or more physical uplink shared channels (PUSCHs) into two groups, the plurality of channels being scheduled for transmission on component carriers (CCs) including a first set of CCs for communicating data and a second set of CCs for communicating control information and the data, wherein the two groups include a first group comprising the one or more PUCCHs and a second group comprising the one or more PUSCHs, wherein to partition the plurality of channels, the at least one processor is configured to multiplex a second PUCCH of the first group with a third PUCCH of the first group that at least partially overlaps in time with the second PUCCH to generate a first PUCCH;
      identify a first subset of PUSCHs of the one or more PUSCHs that is in the second set of CCs; and
      multiplex the first PUCCH of the one or more PUCCHs with a first PUSCH of the first subset of PUSCHs that is in the second set of CCs based on the first PUCCH overlapping in time with at least a part of at least one PUSCH.

2. The apparatus of claim 1, further comprising a transceiver coupled to the at least one processor, and
   wherein the first subset of PUSCHs is identified based on an indication received from a base station for each CCs indicating whether a CC is for communicating the data or communicating the control information and the data.

3. The apparatus of claim 1, wherein the at least one PUSCH includes the first PUSCH with a first order and a second PUSCH with a second order, and
   wherein the first PUSCH is identified for multiplexing with the first PUCCH from the first subset of PUSCHs based on the first order of the first PUSCH being greater than the second order of the second PUSCH of the at least one PUSCH.

4. The apparatus of claim 3, wherein the first order of the first PUSCH with scheduled aperiodic channel state information (CSI) is determined to be greater than the second order of the second PUSCH without scheduled aperiodic CSI.

5. The apparatus of claim 3, wherein the first order of the first PUSCH on a first CC is higher than the second order of the second PUSCH on a second CC based on a first CC index of the first CC being smaller than a second CC index of the second CC.

6. An apparatus for wireless communication at a user equipment (UE), comprising:
   memory; and
   at least one processor coupled to the memory and configured to:
      partition a plurality of channels comprising one or more physical uplink control channels (PUCCHs) and one or more physical uplink shared channels (PUSCHs) into two groups, the plurality of channels being scheduled for transmission on component carriers (CCs) including a first set of CCs for communicating data and a second set of CCs for communicating control information and the data, wherein the two groups include a first group comprising the one or more PUCCHs and a second group comprising the one or more PUSCHs;
      identify a first subset of PUSCHs of the one or more PUSCHs that is in the second set of CCs from a preliminary subset of PUSCHs of at least one PUSCH that has a same channel priority as a first PUCCH and that is in the second set of CCs; and
      multiplex the first PUCCH of the one or more PUCCHs with a first PUSCH of the first subset of PUSCHs that is in the second set of CCs based on the first PUCCH overlapping in time with at least a part of the at least one PUSCH.

7. The apparatus of claim 6, wherein the at least one PUSCH includes the first PUSCH with a first order and a second PUSCH with a second order, and the at least one processor is further configured to:
   determine the first PUSCH of the at least one PUSCH for multiplexing with the first PUCCH from the first subset of PUSCHs based on that the first order of the first PUSCH being greater than the second order of the second PUSCH of the at least one PUSCH.

8. The apparatus of claim 7, wherein the first order of the first PUSCH with scheduled aperiodic channel state information (CSI) is greater than the second order of the second PUSCH without scheduled aperiodic CSI.

9. The apparatus of claim 7, wherein the first order of the first PUSCH on a first CC is higher than the second order of the second PUSCH on a second CC based on a first CC index of the first CC being smaller than a second CC index of the second CC.

10. An apparatus for wireless communication at a user equipment (UE), comprising:
   memory; and
   at least one processor coupled to the memory and configured to: partition a plurality of channels comprising one or more physical uplink control channels (PUCCHs) and one or more physical uplink shared channels (PUSCHs) into two groups, the plurality of channels being scheduled for transmission on component carriers (CCs) including a first set of CCs for communicating data and a second set of CCs for communicating control information and the data, wherein the two groups include a first set of channels and a second set of channels, the first set of channels and the second set of channels having different channel priorities; wherein at least one PUSCH includes the first PUSCH with a first order and a second PUSCH with a second order;
   identify a first subset of PUSCHs of the one or more PUSCHs that is in the second set of CCs;
   determine a first PUSCH for multiplexing with a first PUCCH from the first subset of PUSCHs based on the first order of the first PUSCH being greater than the second order of the second PUSCH of the at least one PUSCH; and
   multiplex the first PUCCH of the one or more PUCCHs with the first PUSCH of the first subset of PUSCHs that is in the second set of CCs based on the first PUCCH overlapping in time with at least a part of the at least one PUSCH.

11. The apparatus of claim 10, wherein the order of the first PUSCH with scheduled aperiodic channel state information (CSI) is higher than the second PUSCH without scheduled aperiodic CSI.

12. The apparatus of claim 10, wherein the first order of the first PUSCH on a first CC is higher than the second order of the second PUSCH on a second CC based on a first CC index of the first CC being smaller than a second CC index of the second CC.

13. An apparatus for wireless communication at a user equipment (UE), comprising:
   memory; and
   at least one processor coupled to the memory and configured to:
      partition a plurality of channels comprising one or more physical uplink control channels (PUCCHs) and one or more physical uplink shared channels (PUSCHs) into two groups, the plurality of channels being scheduled for transmission on component carriers (CCs) including a first set of CCs for communicating data and a second set of CCs for communicating control information and the data, wherein the two groups include a first set of channels and a second set of channels;
      identify a first subset of PUSCHs of the one or more PUSCHs that is in the second set of CCs;
      multiplex a first PUCCH of the one or more PUCCHs with a first PUSCH of the first subset of PUSCHs that is in the second set of CCs based on the first PUCCH overlapping in time with at least a part of the one or more PUSCHs; and
      resolve channel collision between the first set of channels and the second set of channels having different channel priorities based on one of:
         drop one of the first PUSCH multiplexed with the first PUCCH or a third PUSCH that has a lower channel priority if the first PUSCH multiplexed with the first PUCCH would overlap in time with at least a part of the third PUSCH of a second set of PUSCHs, wherein the third PUSCH and the first PUSCH multiplexed with the first PUCCH are scheduled for transmission on a same CC;
         drop one of the first PUSCH multiplexed with the first PUCCH or a fourth PUCCH that has the lower channel priority if the first PUSCH multiplexed with the first PUCCH would overlap in time with at least a part of the fourth PUCCH in the second set of channels;
         multiplex the fourth PUCCH with the first PUSCH multiplexed with the first PUCCH based on the first PUSCH multiplexed with the first PUCCH overlapping in time with at least the part of the fourth PUCCH in the second set of channels;
         multiplex a fifth PUSCH of the first subset of PUSCHs with the third PUSCH of the second set of PUSCHs based on the fifth PUCCH, which is in the first set of channels and does not overlap with any PUSCH of the first subset of PUSCHs, overlapping in time with at least a part of the third PUSCH of a second subset of PUSCHs of the second set of channels that is in the second set of CCs; or
         multiplex the fourth PUCCH with the fifth PUCCH based on the fourth PUCCH in the second set of channels overlapping in time with at least a part of the fifth PUCCH in the first set of channels.

14. The apparatus of claim 13, wherein, to resolve the channel collision between the first set of channels and the second set of channels having the different channel priorities, the at least one processor is further configured to:
   drop one of the first PUSCH multiplexed with the first PUCCH or the third PUSCH that has the lower channel priority if the first PUSCH multiplexed with the first PUCCH would overlap in time with at least the part of the third PUSCH of the second set of PUSCHs and the third PUSCH and the first PUSCH multiplexed with the first PUCCH is scheduled for the transmission on the same CC.

15. The apparatus of claim 13, wherein, to resolve the channel collision between the first set of channels and the second set of channels having the different channel priorities, the at least one processor is further configured to:
   drop one of the first PUSCH multiplexed with the first PUCCH or the fourth PUCCH that has the lower channel priority if the first PUSCH multiplexed with the first PUCCH would overlap in time with at least the part of the fourth PUCCH in the second set of channels.

16. The apparatus of claim 13, wherein, to resolve the channel collision between the first set of channels and the second set of channels having the different channel priorities, the at least one processor is further configured to:
   multiplex the fourth PUCCH with the first PUSCH multiplexed with the first PUCCH based on the first PUSCH multiplexed with the first PUCCH overlapping in time with at least the part of the fourth PUCCH in the second set of channels.

17. The apparatus of claim 13, wherein, to resolve the channel collision between the first set of channels and the second set of channels having the different channel priorities, the at least one processor is further configured to:

multiplex the fifth PUCCH of the first subset of PUSCHs with the third PUSCH of the second set of PUSCHs based on the fifth PUCCH, which is in the first set of channels and does not overlap with any PUSCH of the first subset of PUSCHs, overlapping in time with at least the part of the third PUSCH of the second subset of PUSCHs of the second set of channels that is in the second set of CCs.

18. The apparatus of claim 13, wherein, to resolve the channel collision between the first set of channels and the second set of channels having the different channel priorities, the at least one processor is further configured to:
multiplex the fourth PUCCH with the fifth PUCCH based on the fourth PUCCH in the second set of channels overlapping in time with at least the part of the fifth PUCCH in the first set of channels.

19. A method of wireless communication at a user equipment (UE), comprising:
partitioning a plurality of channels comprising one or more physical uplink control channels (PUCCHs) and one or more physical uplink shared channels (PUSCHs) into two groups, the plurality of channels being scheduled for transmission on component carriers (CCs) including a first set of CCs for communicating data and a second set of CCs for communicating control information and data, wherein the two groups include a first group comprising the one or more PUCCHs and a second group comprising the one or more PUSCHs, wherein partitioning the plurality of channels comprises multiplexing a second PUCCH of the first group with a third PUCCH of the first group that at least partially overlaps in time with the second PUCCH to generate a first PUCCH;
identifying a first subset of PUSCHs of the one or more PUSCHs that is in the second set of CCs; and
multiplexing the first PUCCH of the one or more PUCCHs with a first PUSCH of the first subset of PUSCHs that is in the second set of CCs based on the first PUCCH overlapping in time with at least a part of at least one PUSCH.

20. The method of claim 19, wherein the first subset of PUSCHs are determined from a preliminary subset of PUSCHs of the at least one PUSCH that has a channel priority same as the first PUCCH and that is in the second set of CCs.

21. The method of claim 19, wherein the two groups include a first set of channels and a second set of channels, the first set of channels and the second set of channels having different channel priorities.

22. The method of claim 21, wherein the at least one PUSCH includes the first PUSCH with a first order and a second PUSCH with a second order, and the method further comprising:
determining the first PUSCH for multiplexing with the first PUCCH from the first subset of PUSCHs based on the first order of the first PUSCH of the at least one PUSCH being greater than the second order of the second PUSCH of the at least one PUSCH.

23. The method of claim 21, further comprising resolving channel collision between the first set of channels and the second set of channels having the different channel priorities.

24. An apparatus for wireless communication at a base station, comprising:
memory; and
at least one processor coupled to the memory and configured to:
transmit, to a user equipment (UE), an indication of component carriers (CCs) including a first set of CCs for communicating data and a second set of CCs for communicating control information and the data, wherein the first set of CCs and the second set of CCs are associated with two groups of one or more physical uplink control channels (PUCCHs) and one or more physical uplink shared channels (PUSCHs), wherein the two groups include a first group comprising the one or more PUCCHs and a second group comprising the one or more PUSCHs;
transmit, to the UE, an instruction scheduling a plurality of channels on the CCs including the first set of CCs for communicating the data and the second set of CCs for communicating the control information and the data, the plurality of channels corresponding to the two groups; and
receive, from the UE, a first PUCCH of the one or more PUCCHs multiplexed with a first PUSCH of a first subset of PUSCHs that is in the second set of CCs based on the first PUCCH overlapping in time with at least a part of the one or more PUSCHs.

25. A method of wireless communication of a base station, comprising:
transmitting, to a user equipment (UE), an indication of component carriers (CCs) including a first set of CCs for communicating data and a second set of CCs for communicating control information and the data, wherein the first set of CCs and the second set of CCs are associated with two groups of one or more physical uplink control channels (PUCCHs) and one or more physical uplink shared channels (PUSCHs);
transmitting, to the UE, an instruction scheduling a plurality of channels on the CCs including the first set of CCs for communicating the data and the second set of CCs for communicating the control information and the data, the plurality of channels corresponding to the two groups; and
receiving, from the UE, a first PUCCH of the one or more PUCCHs multiplexed with a first PUSCH of a first subset of PUSCHs that is in the second set of CCs based on the first PUCCH overlapping in time with at least a part of the one or more PUSCHs.

* * * * *